(12) United States Patent
Stricker

(10) Patent No.: US 9,871,962 B2
(45) Date of Patent: Jan. 16, 2018

(54) MOVABLE USER INTERFACE SHUTTER BUTTON FOR CAMERA

(71) Applicant: RollCall, LLC, New York, NY (US)

(72) Inventor: Kathleen Stricker, New York, NY (US)

(73) Assignee: RollCall, LLC, New York, NY (US)

( * ) Notice: Subject to any disclaimer, the term of this patent is extended or adjusted under 35 U.S.C. 154(b) by 0 days.

(21) Appl. No.: 15/440,971

(22) Filed: Feb. 23, 2017

(65) Prior Publication Data

US 2017/0257559 A1    Sep. 7, 2017

Related U.S. Application Data

(60) Provisional application No. 62/303,620, filed on Mar. 4, 2016.

(51) Int. Cl.
| | |
|---|---|
| *H04N 5/232* | (2006.01) |
| *G06F 3/0488* | (2013.01) |
| *G06F 3/0484* | (2013.01) |
| *H04N 5/77* | (2006.01) |

(52) U.S. Cl.
CPC ..... *H04N 5/23216* (2013.01); *G06F 3/04845* (2013.01); *G06F 3/04883* (2013.01); *G06F 3/04886* (2013.01); *H04N 5/23293* (2013.01); *H04N 5/772* (2013.01)

(58) Field of Classification Search
CPC ........... H04N 5/23216; H04N 5/23293; H04N 5/772; G06F 3/04845; G06F 3/04883; G06F 3/04886
See application file for complete search history.

(56) References Cited

U.S. PATENT DOCUMENTS

| | | | |
|---|---|---|---|
| 5,923,908 A | * | 7/1999 | Schrock ................. G03B 7/093 396/263 |
| 7,649,526 B2 | | 1/2010 | Ording et al. |
| 8,428,453 B1 | | 4/2013 | Spiegel et al. |
| 8,621,379 B2 | | 12/2013 | Davydov |
| 8,665,227 B2 | | 3/2014 | Gunawan |
| 9,258,480 B2 | | 2/2016 | Ruben et al. |
| 9,560,264 B2 | | 1/2017 | Marlin et al. |

(Continued)

FOREIGN PATENT DOCUMENTS

CN    104536664 A    4/2015

OTHER PUBLICATIONS

Baranovic, M., "Tutorial—ProCamera HD SnapTrigger for iPad: Customising your Shooting Experience—ProCamera + HDR—Turn your iPhone into a powerful digital camera," Oct. 4, 2012, [Online] [Retrieved on Oct. 13, 2017] Retrieved from the Internet<URL:https://www.procamera-app.com/en/blog/tutorial-procamera-hd-snaptrigger-for-ipad-customising-your-shooting-experience/>.

*Primary Examiner* — Abdelaaziz Tissire
(74) *Attorney, Agent, or Firm* — Robert R. Sachs

(57) ABSTRACT

An electronic device having a camera and a touch-sensitive display supports methods for capturing an image using a movable shutter button thereon. The electronic device executes a camera application that may have a single movable displayed on the touch sensitive display, or two shutter buttons, one of which is fixed and one of which is movable. Where two shutter buttons are used, the second button may be present when the camera application is executed, or may be created in response to the user inputting a gesture to move the first shutter button.

50 Claims, 23 Drawing Sheets

(56) References Cited

U.S. PATENT DOCUMENTS

| | | | |
|---|---|---|---|
| 2007/0013672 A1* | 1/2007 | Shim | G06F 3/04886 345/173 |
| 2008/0119237 A1* | 5/2008 | Kim | G06F 3/0481 455/566 |
| 2010/0020221 A1 | 1/2010 | Tupman et al. | |
| 2011/0063236 A1* | 3/2011 | Arai | G06F 3/0488 345/173 |
| 2012/0229411 A1* | 9/2012 | Arai | G06F 3/04886 345/173 |
| 2012/0281129 A1 | 11/2012 | Wang et al. | |
| 2013/0016268 A1* | 1/2013 | Nakata | G03B 17/14 348/333.01 |
| 2013/0208163 A1* | 8/2013 | Choi | H04N 5/23293 348/333.01 |
| 2013/0286251 A1 | 10/2013 | Wood et al. | |
| 2014/0028885 A1* | 1/2014 | Ma | H04N 5/23216 348/333.01 |
| 2014/0063313 A1* | 3/2014 | Choi | H04N 5/23216 348/333.02 |
| 2014/0071323 A1* | 3/2014 | Yi | G06F 3/04883 348/333.01 |
| 2014/0118479 A1* | 5/2014 | Rapoport | H04N 1/00183 348/36 |
| 2015/0022704 A1* | 1/2015 | Fratti | H04N 5/23216 348/333.01 |
| 2015/0103002 A1* | 4/2015 | Yoon | H04N 5/23293 345/157 |
| 2015/0281577 A1* | 10/2015 | Ruben | H04N 5/23216 348/220.1 |
| 2015/0334291 A1* | 11/2015 | Cho | G06F 3/0488 348/222.1 |
| 2016/0119552 A1* | 4/2016 | Oh | G06F 3/0412 348/333.06 |
| 2016/0165135 A1* | 6/2016 | Lee | H04N 5/23238 348/38 |
| 2016/0191790 A1* | 6/2016 | Wang | H04N 5/23216 348/333.01 |
| 2017/0264818 A1* | 9/2017 | Liao | G06F 3/04817 |

* cited by examiner

MOVABLE USER INTERFACE SHUTTER BUTTON FOR CAMERA

CROSS REFERENCE TO RELATED APPLICATIONS

This application claims the benefit of U.S. Provisional Application No. 62/303,620, filed Mar. 4, 2016, which is incorporated by reference in its entirety.

TECHNICAL FIELD

This disclosure relates generally to gesture based access to a movable shutter button for a camera on electronic devices with touch-sensitive surfaces.

BACKGROUND

A touch-enabled electronic device typically has a touch sensitive surface, such as a touchscreen or touch pad. On such devices, gestures are the primary way that users enter commands and data, and manipulate content items presented in various applications. Some of the touch screen devices such as smartphone and tablet computers include a camera to capture images or record videos. A camera application associated with the camera allows a user to control the operation of the camera.

In most camera applications, an image is captured by touching a graphically represented shutter button, which is typically in a fixed location in the user interface, such as the bottom of the screen. This fixed placement of the shutter button in the user interface is particularly a problem when the camera is a front facing camera (on the same side of the device as the touch-sensitive display), because the location of the shutter button near the bottom edge of the screen forces the user to hold the camera in an awkward manner pinched between several fingers and the base of the thumb. As illustrated in FIG. 1 for example, when taking a photograph with one hand, the user must severely crimp or bend her finger or thumb to reach the shutter button, and as a result the user is much more likely to shake the camera and end up distorting the captured image, or dropping the electronic device. Even when using a rear facing camera, the conventional fixed location of the shutter button makes it difficult to securely hold the electronic device.

In addition to capturing an image, the shutter button allows capture of a video stream. In some camera applications, a user has to hold the shutter button for the entire time of capture of a video. This is quite inconvenient, especially if a video is being recorded by a front camera. The user is likely to shake the camera for the entire video recording resulting in a poorly recorded video stream.

SUMMARY

The embodiments herein describe an electronic device with touch-sensitive display and a camera controlled by a camera application, where the shutter button of the camera application is movable, allowing the user to position the shutter button at a location on the touch-sensitive display that makes it easier for the user to reach and activate the shutter button. The movable shutter button thereby eliminates the problems associated with a fixed shutter button, as the user can hold the electronic device securely, and move the shutter button to a location on the touch-sensitive display corresponding to a normally and comfortably flexed position of the user's thumb or finger. In addition, the embodiments include methods for displaying a movable shutter button in addition to a capture button to capture an image or a video on a portable electronic device.

In one embodiment, a computer-implemented method is provided in an electronic device having a front camera and a touch-sensitive display. The camera is controlled by a camera application executed by the electronic device and the touch sensitive display is coupled to the camera to receive images from the camera. The camera application is controlled by a user interface presented on the touch-sensitive display. The user interface of the camera application includes a graphical representation of a shutter button that can be moved by the user to a desirable location on the touch-sensitive display using a touch input gesture on the shutter button, moving it from a first location, such as its initial or default location, to a second, user selected, location on the touch sensitive display. The camera application may be a native application included with the electronic device or may be a third party application downloaded and installed on the electronic device after manufacturer.

One method comprises displaying a shutter button of the camera application at a first location on the touch-sensitive display. The first touch location can be towards the bottom of the display or some other location, such as the center of the display. While the shutter button is displayed at the first location, a first touch input to the touch sensitive display is detected on the shutter button. The camera application determines whether the touch input is an input to activate the shutter button or an input to move the shutter button. The input to activate the shutter button may be a tap gesture (or a double tap to avoid accidental activation of the shutter button). The input to move the shutter button may be a drag gesture (or slide gesture); the gestures to activate the shutter button versus move the shutter button may be differentiated by movement during the gesture (distance or direction) or the duration of the gesture. Based on the determination that the touch input is an input to move the shutter button to a second, user selected, location on the touch-sensitive display, rather than an input to activate the shutter, the shutter button is moved to the second location associated with the input, for example, towards a top edge of the touch-sensitive display, the center of the display or any other location selected by the user. The second location is determined from attributes of the touch input, such as the location on the screen where the gesture is determined to terminate (e.g., lift off of the touch input). If the first touch input is determined to be an input to activate the shutter button then the image is captured.

While the shutter button is displayed at the second location, an image is received from the camera and displayed on the touch-sensitive display such that the shutter button is displayed over the displayed image. A second touch input on shutter button at the second location is detected. The camera application again determines whether the touch input is an input to activate the shutter button or an input to move the shutter button. Responsive to the second touch input being an input to activate the shutter button, the image being displayed is captured with the camera and stored on the device by the camera application. If the camera application determined that the second touch is an input to move the shutter button, the shutter button would then be moved to another location.

In another embodiment, upon determining that the touch input is an input to move rather than an input to activate the shutter, a second shutter button is created at the location of the first shutter button and the second shutter button is moved to the second, user selected, location, thereby causing the camera application to display two shutter buttons concurrently. While the second shutter button is displayed at the second location, an image is received from the camera and displayed on the touch-sensitive display such that the shutter button is displayed over the displayed image. A second touch input on touch sensitive display at the second location for the second shutter button is detected. The camera application again determines whether the touch input is an input to activate the shutter button or an input to move the shutter button. Responsive to the second touch input being an input to activate the second shutter button, the image being displayed is captured with the camera and stored on the device by the camera application. If the camera application determines that the second touch is an input to move the second shutter button, the second shutter button would then be moved to another location. If the second touch input is received instead at the location of the first shutter button, and is determined to be an input to activate the first shutter button, the image being displayed is captured with the camera and stored on the device by the camera application.

In another embodiment, the camera application initially displays two shutter buttons on the touch-sensitive display of electronic device. The first shutter button is fixed, and the second shutter buttons is movable in response to touch input. A method of this embodiment includes displaying the first shutter button of a camera application at a first location. The second shutter button of a camera application is displayed over the first shutter button at the first location. Preferably, the graphical representations for the first and second shutter buttons are different from each other. For example, the second shutter button may be visually smaller than the first shutter button or the second shutter button may be of a different color or at a different transparency level than the first shutter button.

While both shutter buttons are displayed at the first location, a first touch input is detected on the second shutter button. The camera application determines whether the touch input is an input to activate the shutter button or an input to move the shutter button, as above. Based on the determination that the touch input is an input to move the second shutter button to a second, user selected, location on the touch-sensitive display, rather than an input to activate the shutter the second shutter button is moved to the second location. While the second shutter button is displayed at the second location, an image is received from the camera and displayed on the touch-sensitive display such that the shutter button is displayed over the displayed image. A second touch input on the second shutter button is detected. The camera application again determines whether the touch input is an input to activate the shutter button or an input to move the second shutter button. Responsive to the second touch input being an input to activate the second shutter button, the image being displayed is captured with the camera and stored on the device by the camera application. If the camera application determines that the second touch is an input to move the shutter button, the second shutter button would then be moved to another location. If the second touch input is received instead at the location of the first shutter button, and is determined to be an input to activate the first shutter button, the image being displayed is captured with the camera and stored on the device by the camera application.

In all of the various embodiments, the movable shutter button may be moved repeatedly in the manner described to other user selected locations, both before or after an image is captured. Thus, once the shutter button is at the second location, the user may move it to third, fourth, and any number of subsequent locations. Further, from the foregoing it is apparent that operations of the movable shutter are modeless, in that user does not need to first activate a specific mode, such as an shutter icon positioning mode, to enable a shutter button to be moved, and then return to a default mode to use the shutter button to capture an image.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION

In embodiments described below, an electronic device with at least one camera and touch sensitive display executes a camera application with a user interface providing a movable shutter button for capturing an image with the camera. In some embodiments, a single shutter button is movable from a first location to a second location in response to a first touch input. In other embodiments, a second shutter button is created, where the second shutter button is movable to a second location in response to a first touch input. In still other embodiments, two shutter buttons are displayed within a camera view, with a first shutter button being fixed at a first location, and a second shutter button is moved to a second location in response to a touch input. The movable shutter allows the user to easily access the shutter button to capture an image, as the user can position the shutter button at a location on the display that is most easily and naturally reached by the user's fingers (including thumb) when the user is holding the electronic device with one hand, especially when capturing an image via a front camera. As a result of the being able to move the shutter on the display, there is less or no camera shake, thus resulting in a better quality image, and a less risk of dropping the device.

Figure 1:
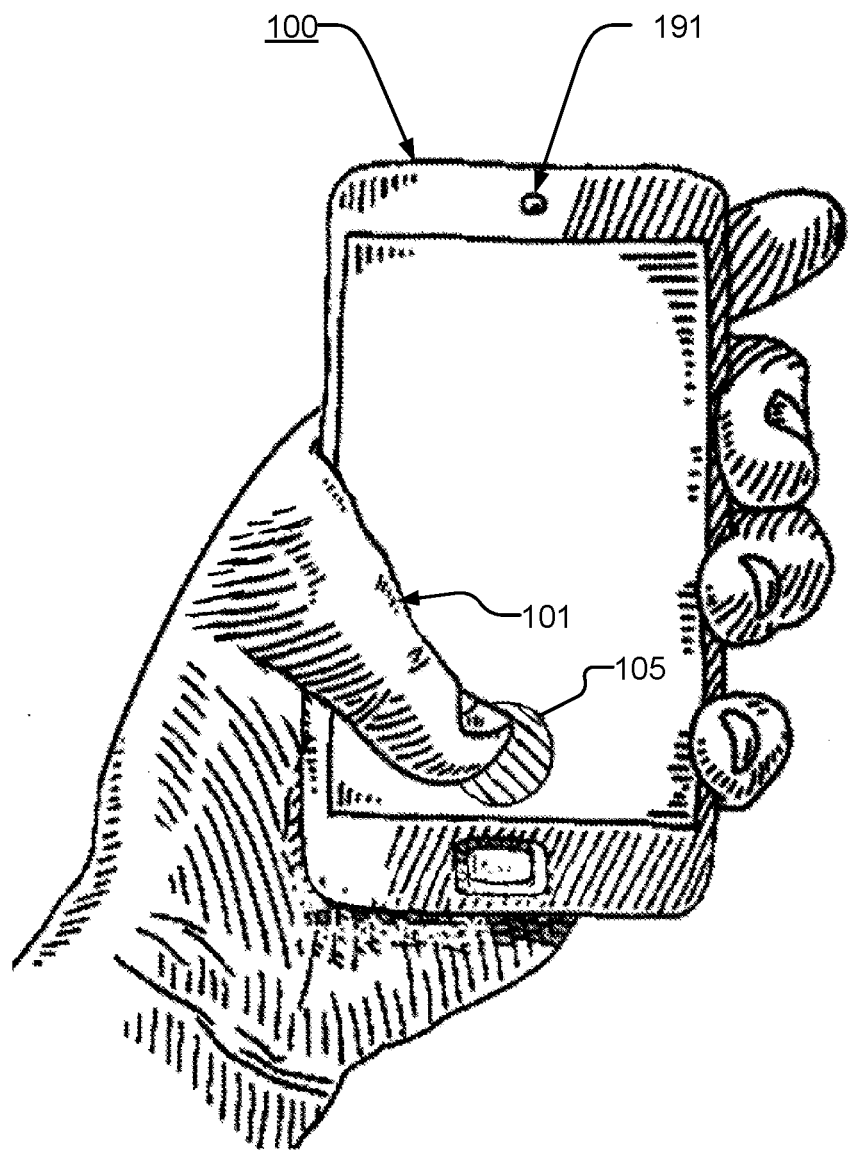
FIG. 1 illustrates a hand holding an electronic device in position to take a self-portrait.
Figure 2:
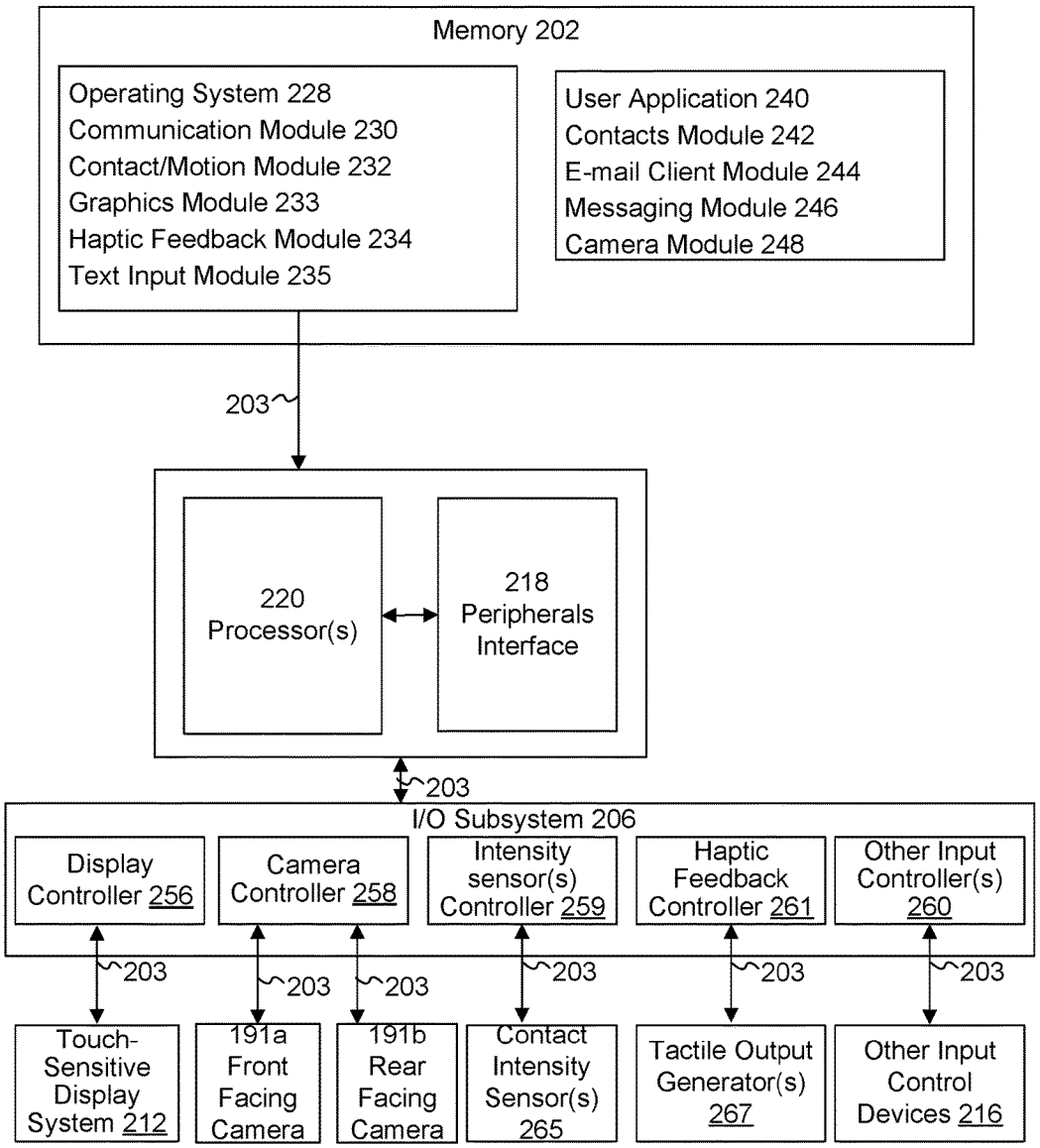
FIG. 2 is a block diagram illustrating a portable multifunction device with a touch-sensitive display in accordance with some embodiments.
Figure 3:
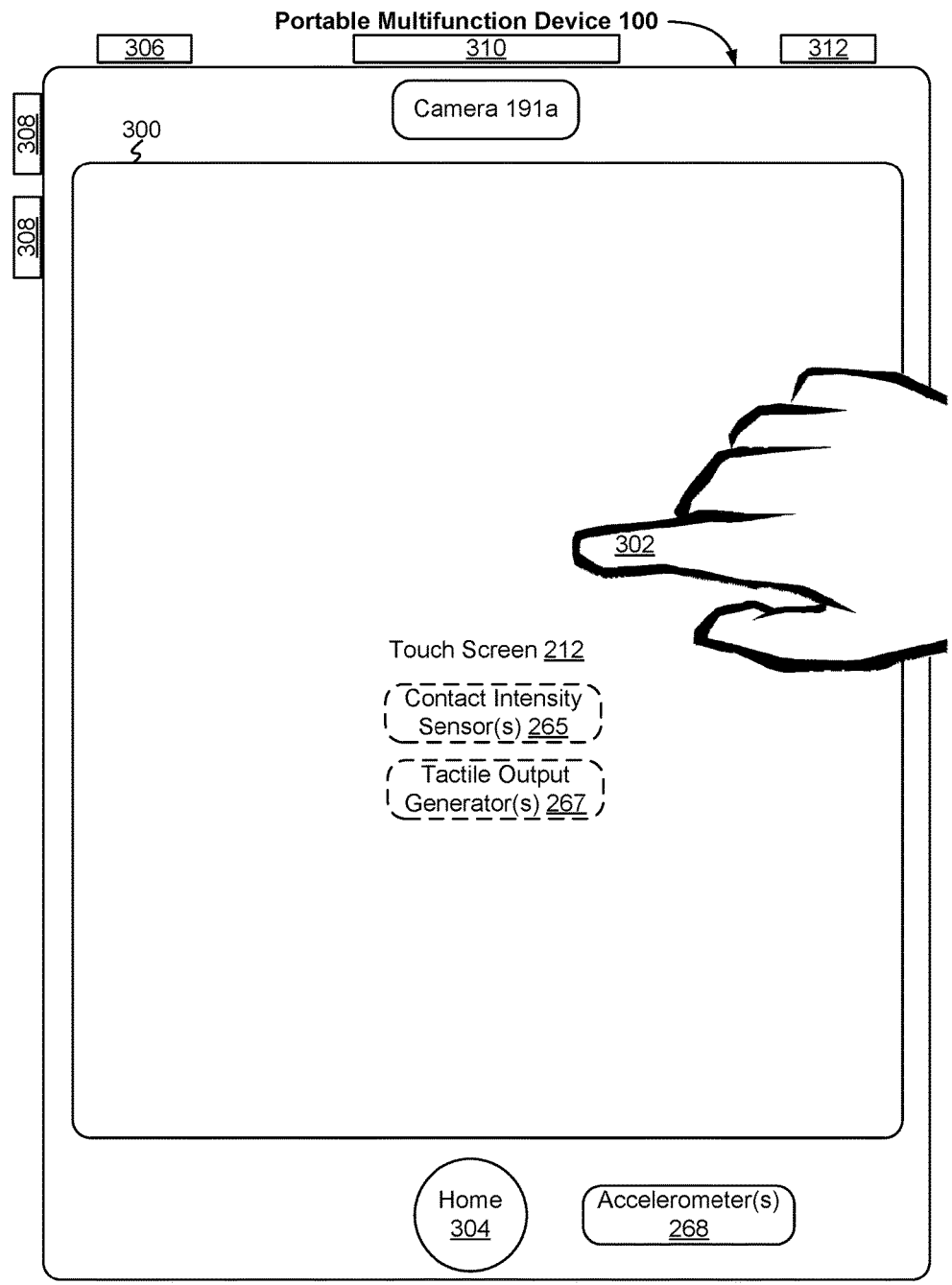
FIG. 3 illustrates a portable multifunction device having a touch screen in accordance with some embodiments.
Figure 13:
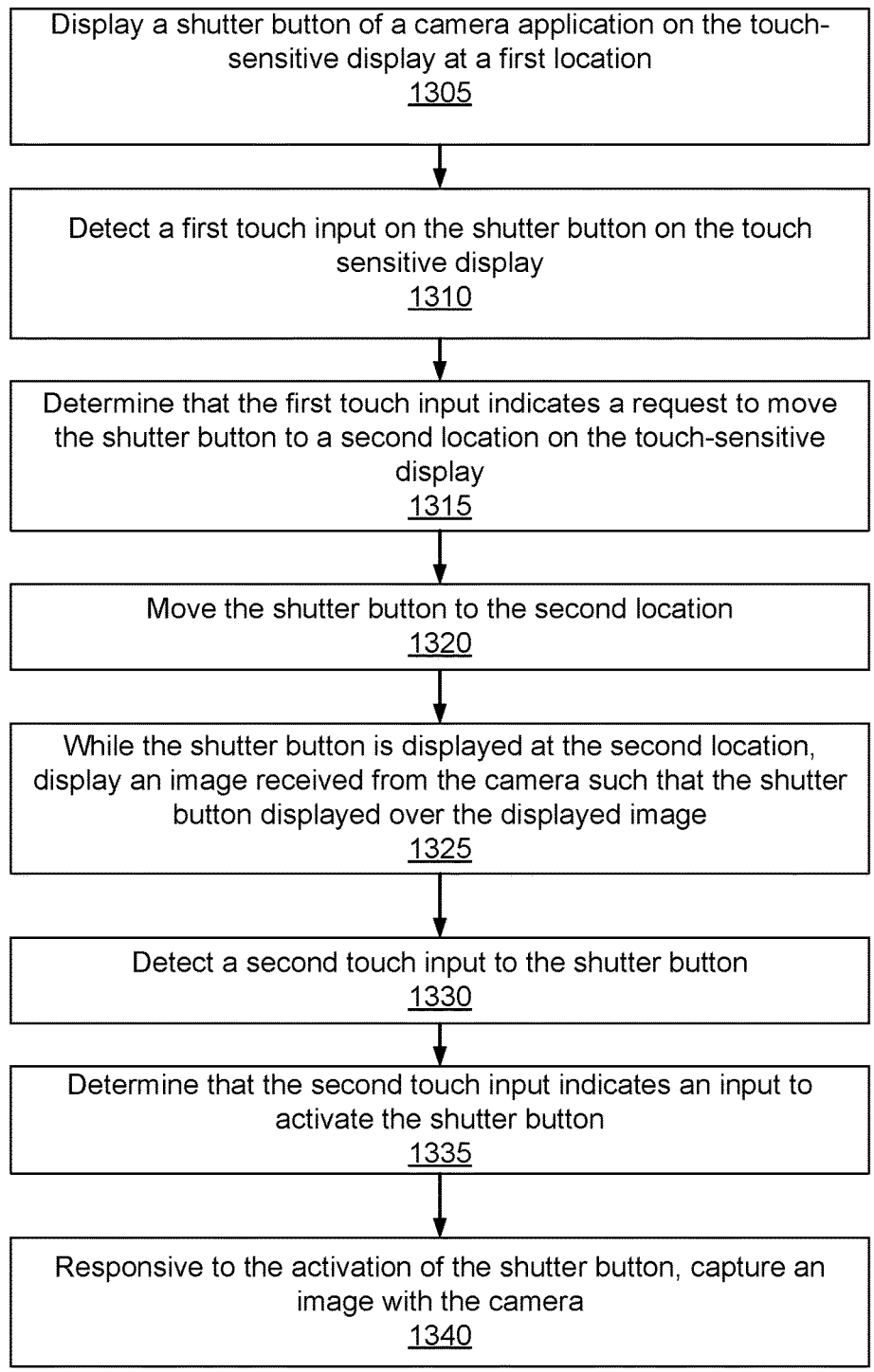
FIG. 13 is a method flow diagram for capturing an image with the camera using a movable single shutter button.
Figure 14:
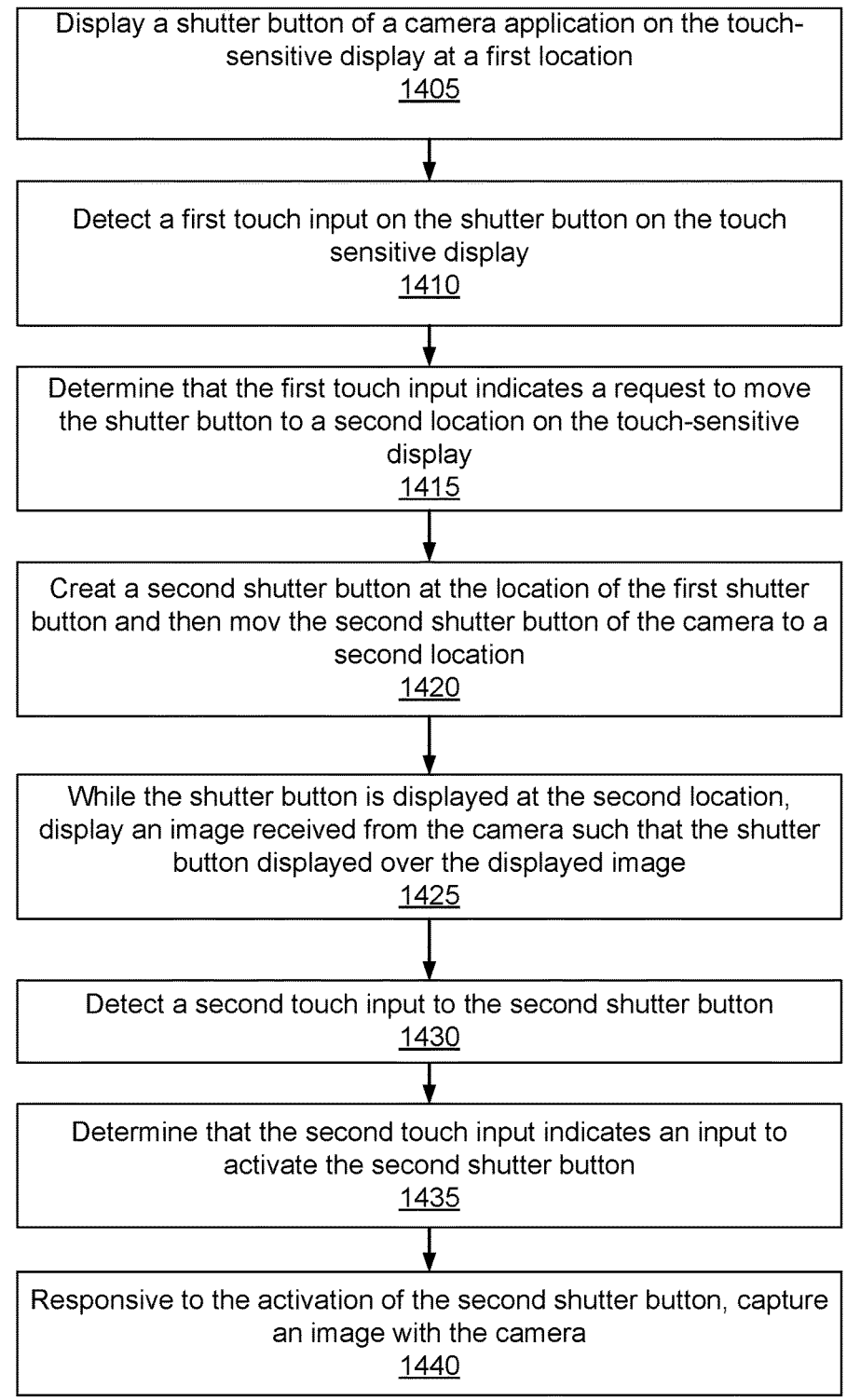
FIG. 14 is a method flow diagram for creating and moving a second shutter button to a second location that is different than the location of a first shutter button and capturing an image with the camera using the second shutter button.
Figure 15:
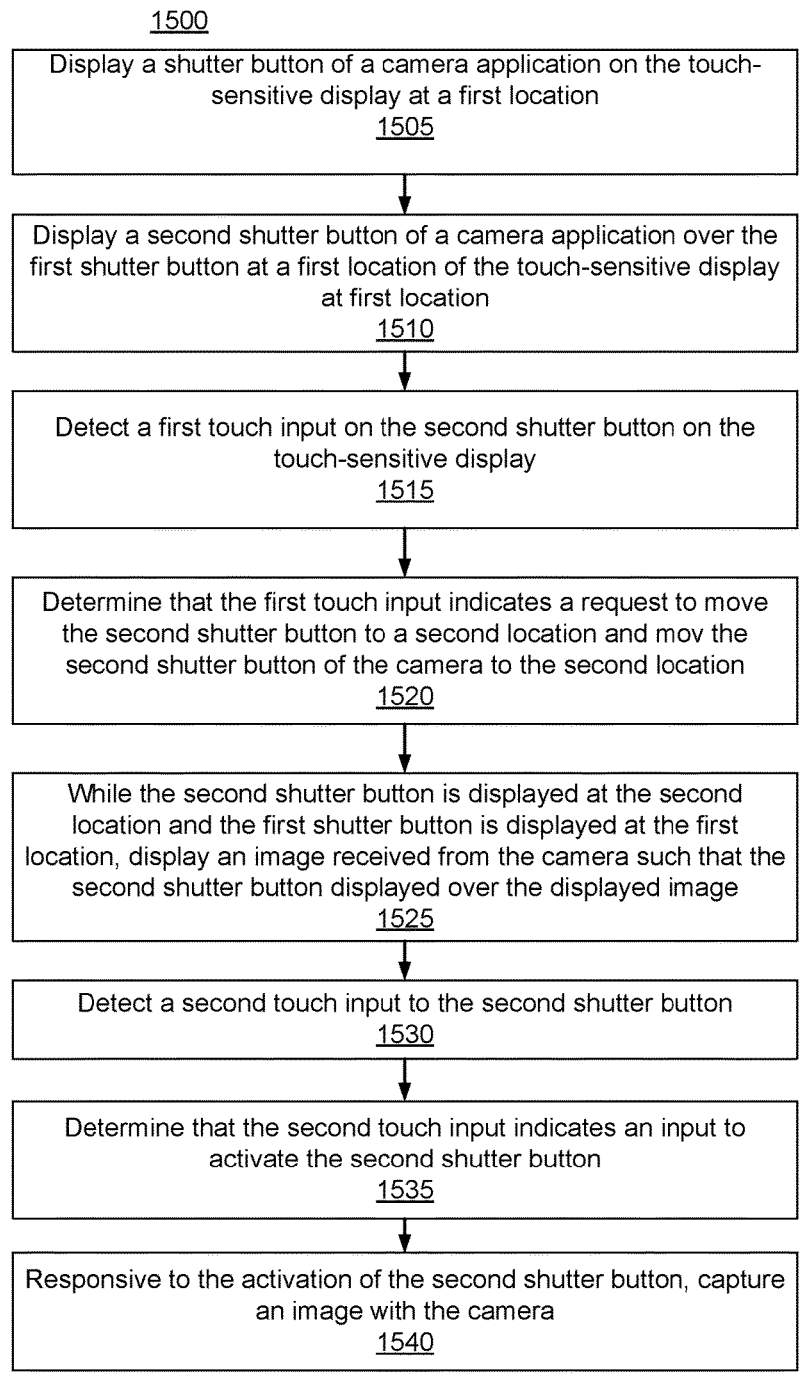
FIG. 15 is a method flow diagram for displaying a first shutter button at a first location and a second shutter button at a second location and capturing an image with the camera using the second shutter button.

Below, FIG. 1 illustrates a hand holding of an example device for capturing a self-portrait. FIGS. 2 and 3 provide a description of exemplary devices. FIGS. 4-12 illustrates example user interfaces for displaying a movable shutter button and capturing an image using the movable shutter button. FIGS. 13-15 illustrate flowchart methods for creating a movable shutter button and capturing an image using the movable shutter button in various embodiments.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

FIG. 1 illustrates a hand holding an electronic device 100 in position to take a self-portrait using a front camera 191 of an electronic device. Here, the operator has used their thumb 101 to click the shutter button 105 of a camera application on the electronic device 100. The operator's thumb is crimped and bent to reach the shutter button. As a result the operator is much more likely to shake the camera 191 and end up distorting the captured image, or dropping the electronic device 100. This problem also arises when the user holds the electronic device 100 in a portrait orientation, whether by holding the electronic device 100 along opposing edges between the middle finger and thumb and attempting to use the index finger to control the shutter button 105, or by pinching the electronic device 100 between one or more finger and the palm.

FIG. 2 is a block diagram illustrating portable electronic device 100 with a touch-sensitive display 212 (equivalently touch screen, or touch-sensitive display). Device 100 includes memory 202, one or more processing units (CPU's) 220, peripherals interface 218, input/output (I/O) subsystem 206, and other input or control devices 216. Device 100 optionally includes one or more optical sensors 164 and one or more intensity sensors 265 for detecting intensity of contacts on device 100 (e.g., a touch sensitive surface such as touch-sensitive display 212 of device 100). A tactile output generator 267 generating tactile outputs on device 100, such as vibrations of the touch sensitive display 212 of device 100. These components optionally communicate over one or more communication buses or signal lines 203.

Memory 202 includes high-speed random access memory and may include non-volatile memory, such as one or more magnetic disk storage devices, flash memory devices, or other non-volatile solid-state memory devices. The memory 202 contains an operating system 228 and related low level modules, as well as user applications 240, as further described below.

Peripherals interface 218 connects the input and output peripherals of the device 100 to CPU 220 and memory 202 via one or more buses 203. A processor 220 (or set of multiple processors) executes the operating system 228 and its modules, as well as user applications 240

The I/O subsystem 206 couples input/output peripherals on device 100, such as touch screen 212 and other input control devices 216, to peripherals interface 218. I/O subsystem 206 optionally includes display controller 256, optical sensor controller 258, intensity sensor controller 259, haptic feedback controller 261 and one or more input controllers 260 for other input or control devices. Input controllers 260 receive/send electrical signals from/to other input or control devices 216. The other input control devices 216 include physical buttons (e.g., push buttons, rocker buttons, etc.) as may be used in the device 100.

Touch sensitive display 212 provides an input interface and an output interface between the device and a user. Display controller 256 receives and/or sends electrical signals from/to touch screen 212. Touch sensitive display 212 displays visual output to the user. The visual output comprises graphical representation of objects, such as window, buttons, frames, menus and the like.

Touch sensitive display 212 has a touch-sensitive surface, sensor or set of sensors that accepts input from the user based on haptic and/or tactile contact. Touch sensitive display 212 and display controller 256 (along with any associated modules and/or sets of instructions in memory 202) detect contact (and any movement or breaking of the contact) on touch sensitive display 212 and converts the detected contact into interaction with user-interface objects (e.g., one or more soft keys, icons, web pages or images) that are displayed on touch sensitive display 212. In an exemplary embodiment, a point of contact between touch sensitive display 212 and the user corresponds to a finger of the user. As used herein, the term "finger" is understood both the four fingers and the thumb as well, for convenience of description.

The device 100 includes at least one camera 191, and preferably includes two cameras, a front facing camera 191a, and a rear facing camera 191b, coupled to a camera controller 258. Camera 191a is front facing in that it is located on the same side of the device 100 as the display 212, and camera 191b is rear facing as being located on the opposite side. The camera(s) includes an optical sensor which receives light through a lens, and then converts the received light to image data (pixel intensity information) for each pixel location on the touch sensitive display 212. The camera(s) is controlled by camera module 248 to captures still images or video. The touch sensitive display is coupled to the output of the cameras, and thus when either camera is activated, the image data from the camera is shown in the touch-sensitive display.

Device 100 further includes contact intensity sensors 265. FIG. 1 shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display 212). In some embodiments, at least one contact intensity sensor is located on the back of device 100, opposite touch screen display 212 which is located on the front of device 100.

Device 100 may also include tactile output generators 267 coupled to haptic feedback controller 261 in I/O subsystem 206. Tactile output generator 267 may use electroacoustic devices such as speakers or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 100 that are capable of being sensed by a user of device 100. In some embodiments, at least one tactile output generator is collocated with, or proximate to, a touch-sensitive surface (e.g., touch-sensitive display 212) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 212 which is located on the front of device 100.

Memory 202 include operating system 228 and related modules including a communication module 230, contact/motion module 232, graphics module 233, haptic feedback module 234, text input module 135. Communication module 230 facilitates communication with other devices over one or more external ports and also includes various software components for handling data received by RF circuitry (not shown) for communication with wireless networks. Contact/motion module 232 optionally detects contact with touch sensitive display 212 (in conjunction with display controller 256). Contact/motion module 232 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 232 receives contact data from the touch-sensitive surface.

Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts).

In some embodiments, contact/motion module 232 uses a set of one or more intensity thresholds to determine whether an operation has been performed by a user (e.g., to determine whether a user has tapped on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, tap threshold of a touch screen display can be set to any of a large range of predefined thresholds values without changing the touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level tap "intensity" parameter).

Contact/motion module 232 is configured to detect a gesture input by a user. Different gestures on the touch-sensitive surface have different contact patterns (e.g., different motions, timings, and/or intensities of detected contacts). A gesture is detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger drag gesture on the touch-sensitive surface includes detecting a finger-down event followed by detecting one or more finger-dragging events, and subsequently followed by detecting a finger-up (lift off) event.

Graphics module 232 includes various known software components for rendering and displaying graphics on touch sensitive display 212 or other display, including components for changing the visual impact (e.g., brightness, transparency, saturation, contrast or other visual property) of graphics that are displayed. The term "graphics" or "graphical representation" includes any object that can be displayed to a user, including without limitation text, web pages, icons (such as user-interface objects including soft keys), digital images, videos, animations and the like.

Haptic feedback module 233 includes various software components for generating instructions used by tactile output generator(s) 267 to produce tactile outputs at one or more locations on device 100 in response to user interactions with device 100.

Text input module 234, which is, optionally, a component of graphics module 232, provides soft keyboards for entering text in various applications (e.g., contacts, e-mail, IM, browser, and any other application that needs text input).

User applications 240 include a contact application 242, an email client application 244, a messaging application 246 and a camera application 248.

FIG. 3 illustrates a portable multifunction device 100 having a touch sensitive display 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure). In some embodiments, selection of one or more graphics occurs when the user breaks contact with the one or more graphics. In some embodiments, the gesture optionally includes one or more taps, one or more swipes or pans (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a drag gesture that sweeps over an application icon optionally does not select the corresponding application when the gesture corresponding to selection is a tap.

Device 100 optionally also includes one or more physical buttons, such as "home" or menu button 304. As described previously, menu button 304 is, optionally, used to navigate to any application in a set of applications that are, optionally, executed on device 100. Alternatively, in some embodiments, the menu button is implemented as a soft key in a GUI displayed on touch sensitive display 212.

User Interfaces and Associated Processes

Figure 4:
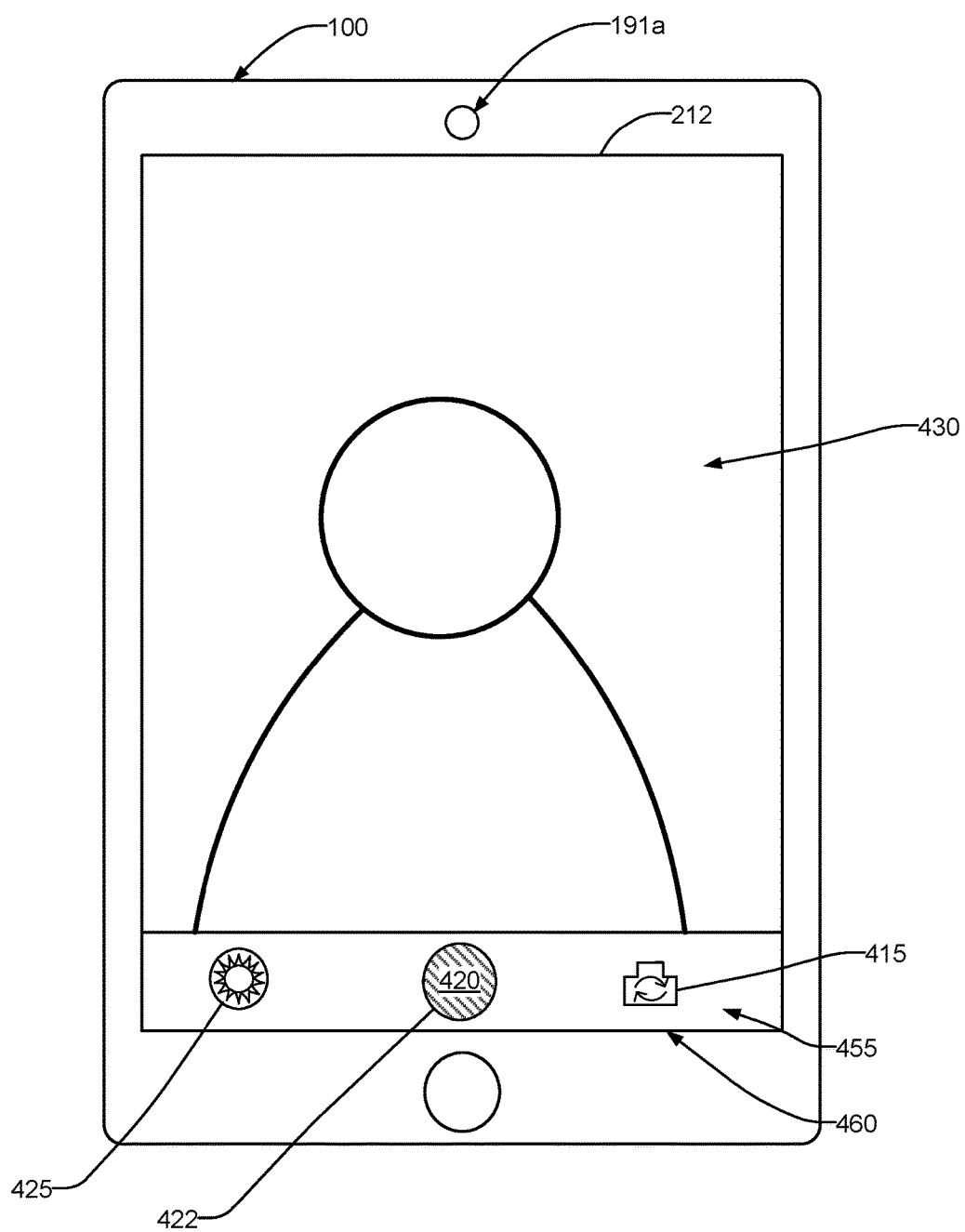
FIG. 4 illustrates an example user interface of a camera application including a shutter button on an electronic device.

FIG. 4 illustrates an example user interface of a camera application 248 including a shutter button on an electronic device 100 including a touch-sensitive (i.e. touch-screen) display 212. As noted above, the electronic device 100 includes at least one camera, in which case the camera is a front facing camera, and preferably includes two cameras, that is a front facing camera 191a and a rear facing camera (not shown in FIG. 3). A user may capture a self-portrait image (i.e. "selfie") using the front facing camera 191a or a rear facing image using a rear facing camera 191b. The camera application 248 allows a user to capture images using either camera. On execution of a camera application 248, a camera view is displayed on the display screen 212. The camera view includes an image 430 that is received through the camera lens displayed within a camera frame, either from the front camera 191a or a rear camera 191b, a camera control panel 455 a display area above the camera frame, and a display area below the camera frame, if any within the touch-sensitive display screen 212.

The camera control panel 455 is located near the bottom edge 460 of touch-screen display 212. The camera control panel 455 includes a flash button 425, a shutter button 420 and a camera selection button 415. The flash button 425 allows a user to control the flash settings of the camera. A flash provides additional light when capturing an image, in case the surrounding light conditions are not adequate enough for capturing an image. A user can select between turning on flash for the camera, turning off flash or automatic determination of turning on or off of the flash for the camera using the flash button 425.

The camera selection button 425 allows a user to select enabling of the front facing camera 191a or the rear facing camera 191b if both are present. In one embodiment, the rear facing camera is selected by default on executing the camera application 248. The shutter button 420 is displayed at the center of the camera control panel 455 on the touch-screen display. The shutter button 420 allows capturing an image displayed within the camera view. In other embodiment, the control panel 455 is not displayed, and the camera frame occupies the entire area of the display screen 212. In such embodiments, the shutter button 420, the flash button 425 and camera selection button 415 are displayed overlaid on the image 430.

First Embodiment: Movable Single Shutter Button

Figure 5A:
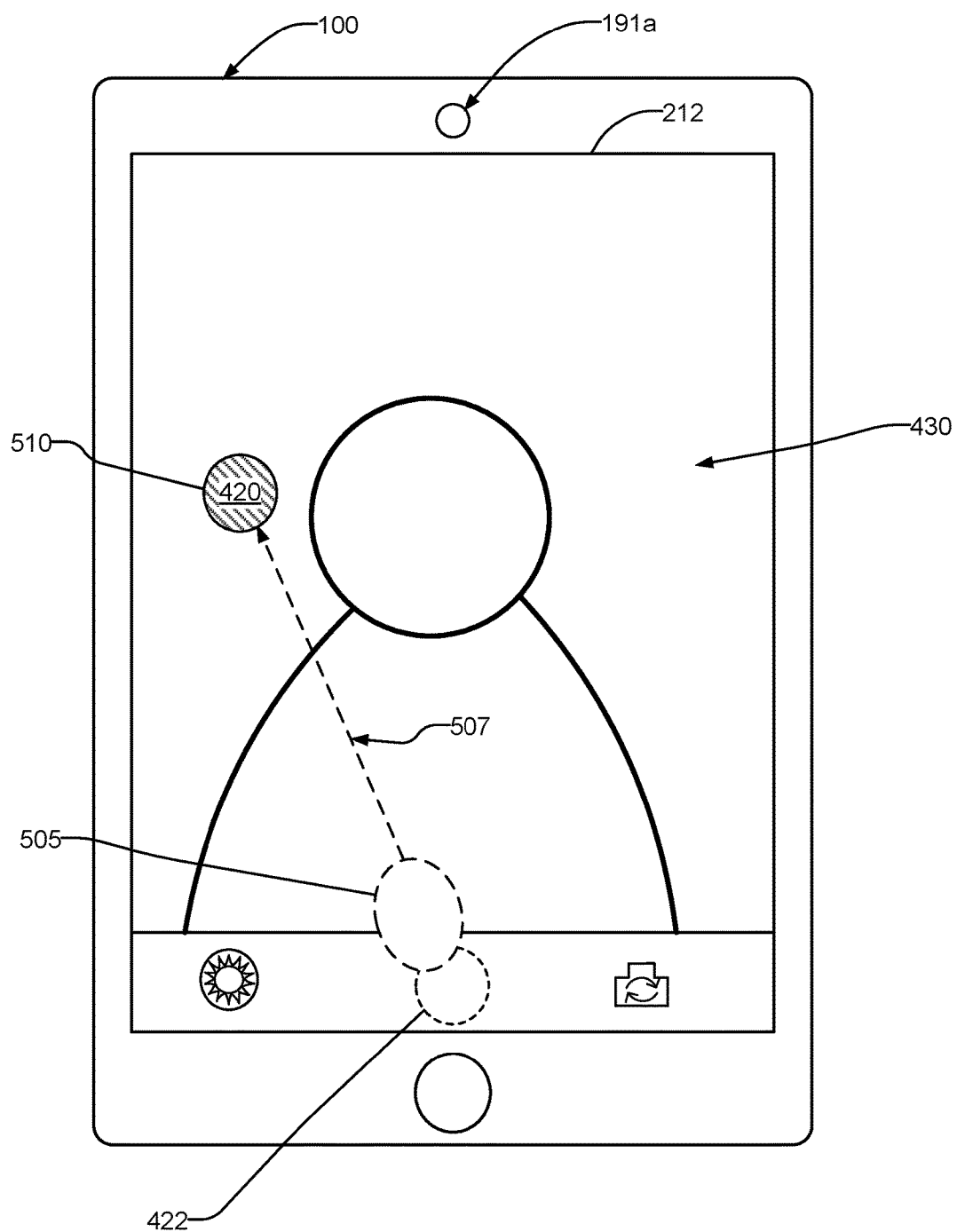
FIG. 5A illustrates an example user interface of the camera application, and the receipt of a touch input gesture to move the shutter button on a touch sensitive display.

FIG. 5A illustrates an example user interface of the camera application 248, and the receipt of a touch input gesture to move the shutter button 420 on a touch sensitive display 212. In this embodiment, the shutter button 420 is displayed at a first location 422 (e.g. center of the camera control panel 455) on the touch-screen display 212. The first location 422 includes any of the pixel locations within a defined boundary of the shutter button 420, and is not limited to a single pixel location therein. While the shutter button 420 is displayed, a first touch input 505 is detected on the shutter button 420 at the first location 422. The touch input 505 is processed by the motion module 232, which receives the touch input locations and parameters (speed, direction, etc.) and passes this data to the camera application 248. The camera application 248 determines whether the first touch input 505 indicates to an input to move the shutter button 420 or an input to activate the shutter button 420.

Various gestures or combinations of gestures may be used to indicate an input to move the shutter button, and to indicate an input to activate the shutter button. In one embodiment, the gesture to move the shutter button is a drag gesture that starts at the first location 422 and continues with a motion 507 that ends at a second location 510 anywhere within the camera view on the display 212. The motion module 232 detects the drag gesture by detecting a finger-down event followed by a finger dragging event across a continuous series of locations on the touch screen display 212 and subsequently followed by detecting a finger-up (lift off) event at the second location. Alternatively the gesture to move the shutter button 420 may be a long press followed by a drag gesture. The input to activate the shutter button 420 can be a tap gesture, in which case the motion module 232 detects finger down event followed shortly thereafter by a finger up event; a double tap gesture may also be used to further differentiate the gesture to move the shutter button from the gesture to activate the shutter button, and thereby avoid accidental activations.

In response to the first input being an input to move the shutter button 420, the camera application 248 moves the shutter button 420 to the second, user selected, location 510. In one embodiment of moving the shutter button 420, camera application 248 animates the motion of the button from the first location 422 to the second location, so that it appears to slide along with the first touch input 505 gesture. In another embodiment, the camera application 248 may determine the second location 510 once the first touch input 505 gesture completes and then move the shutter button 420 to the second location 510. The second (or any subsequent user selected location to which the shutter button 420 button may be moved) may be called a custom location. If the camera application 248 determines that the first input is instead an input to activate the shutter button 420, then the camera application 248 captures the image 430 and stores it in the memory 202.

While the shutter button 420 is moved to the second location, the image 430 received from the camera is displayed within the camera view and the shutter button 420 is displayed over the displayed image 430. In one embodiment, the representation of the shutter button 420 is changed to be translucent such that the displayed image is partially visible through the shutter button 420. While the shutter button 420 is at the second location 510, a second touch input is detected on the shutter button 420. The camera application 248 determines whether the second touch input on the shutter button 420 indicates an input to capture an image or an input to move the shutter button 420 to a further user selected location. If the camera application 248 determines that the second touch is an input to move the second shutter button, the second shutter button is moved to another user selected location, based on the parameters of the input. If the camera application 248 determines that the input is an input to activate the shutter button 420, the camera application 248 captures the displayed image and stores it the memory 202.

Figure 5B:
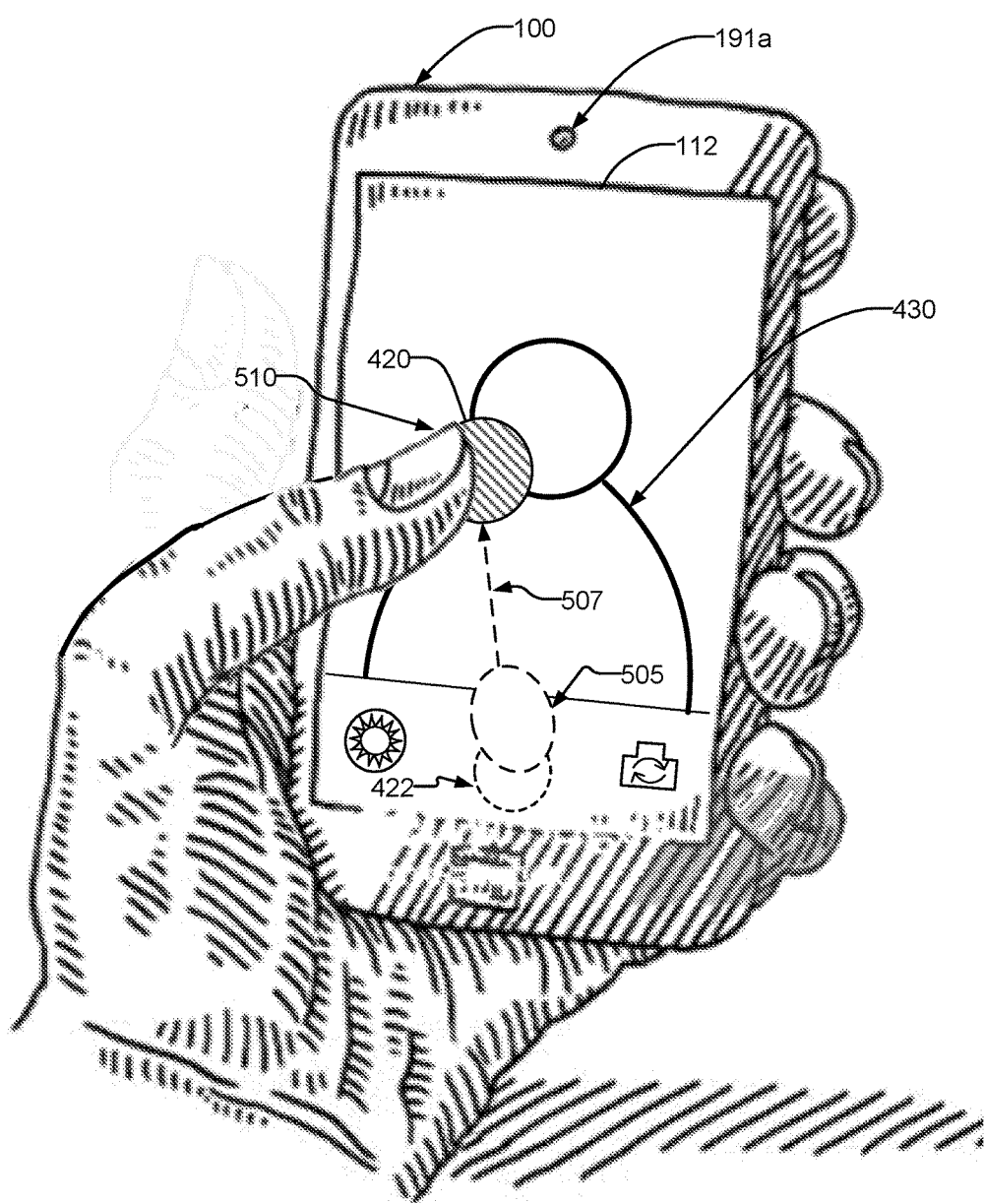
FIG. 5B illustrates an example of a hand holding and operating an electronic device using a touch gesture to move the shutter button on a touch sensitive display.

FIG. 5B illustrates a hand holding and operating an electronic device 100 with a movable shutter button, in the manner described above. Here, the operator has used their thumb to move 507 the shutter button 420 using the gesture input 505 from the first location 422 to the user selected second location 510. As shown, the shutter button 420 overlays the image 430 captured from the camera 191a. The operator's thumb is more naturally extended and thus the user is able to more securely hold the electronic device 100.

Once the shutter button 420 has been moved to a user selected location, there are several options for managing its persistence. In one embodiment, the shutter button 420 remains at the second location 510 until the camera application 248 is exited; upon the next execution of the camera application 248 the shutter button 420 appears at the first location again. Alternatively, the second location 510 can be stored as a new default location for shutter button 420 (which thus becomes the new value for the first location) so that the next time the camera application 248 is executed, the shutter button 420 appears immediately at the second location 510. From that second location 510 it can be further moved to any desired location. Whether the shutter button 420 is restored to the first location 422 or is persisted at the second location 510 can be configured by a user setting indicating whether to restore the shutter button 420 to its default position, or retain the last used position (i.e., the second location 510).

Second Embodiment: Creation of a Second Shutter Button

Figure 6A:
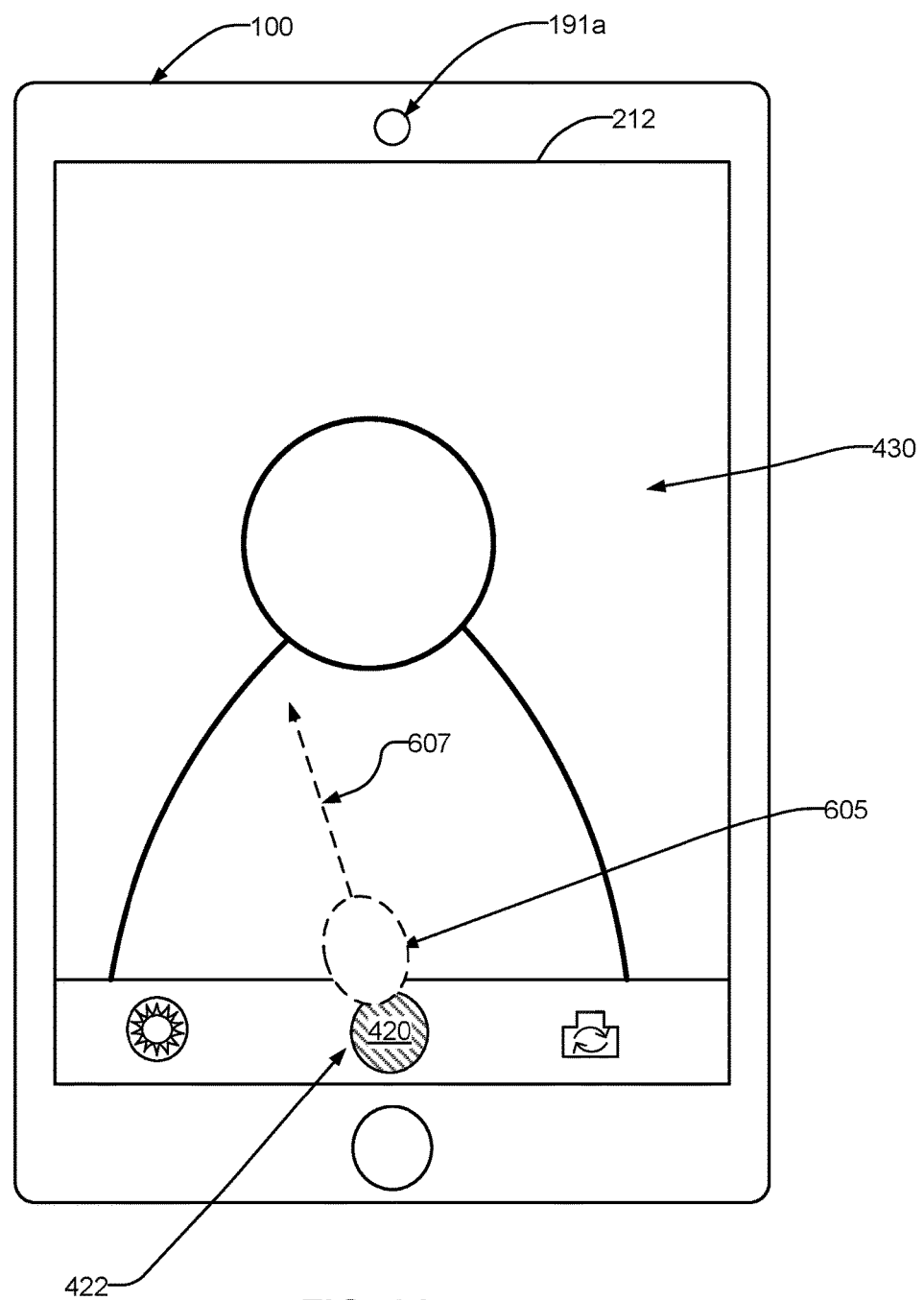
FIG. 6A illustrates another example user interface of the camera application, and the creation of a second shutter button on a touch sensitive display of an electronic device.

FIG. 6A illustrates another example user interface of the camera application 248, and the creation of a second shutter button on a touch sensitive display of an electronic device 100. In this embodiment, the shutter button 420 is displayed at a first location 422 (e.g. center of the camera control panel 455) on the touch-screen display 212. While the shutter button 420 is displayed, a first touch input 605 is detected on the shutter button 420 at the first location 422.

On detecting the first touch input 605, the motion module 232 receives the touch input locations and parameters (speed, direction, time, etc.) and passes this data to the camera application 248. The camera application 248 determines whether the first touch input 605 indicates an input to move the shutter button 420 or an input to activate the shutter button 420.

In this example, the first touch input 605 is an input to move the shutter button 420 that is a drag gesture that starts at the first location 422, continues with a motion 607 and ends at a user selected second location on the display 212. The motion module 232 detects the drag gesture by detecting a finger press event on the shutter button followed by detecting a continuous drag event with the shutter button depressed by the finger, the finger drag event across a continuous series of locations on the touch screen display 212, and subsequently followed by detecting a finger-up (lift off) event. In response thereto, the camera application 248 first creates a second shutter button and then moves the second shutter button to the second location, in the manner described above.

Figure 6B:
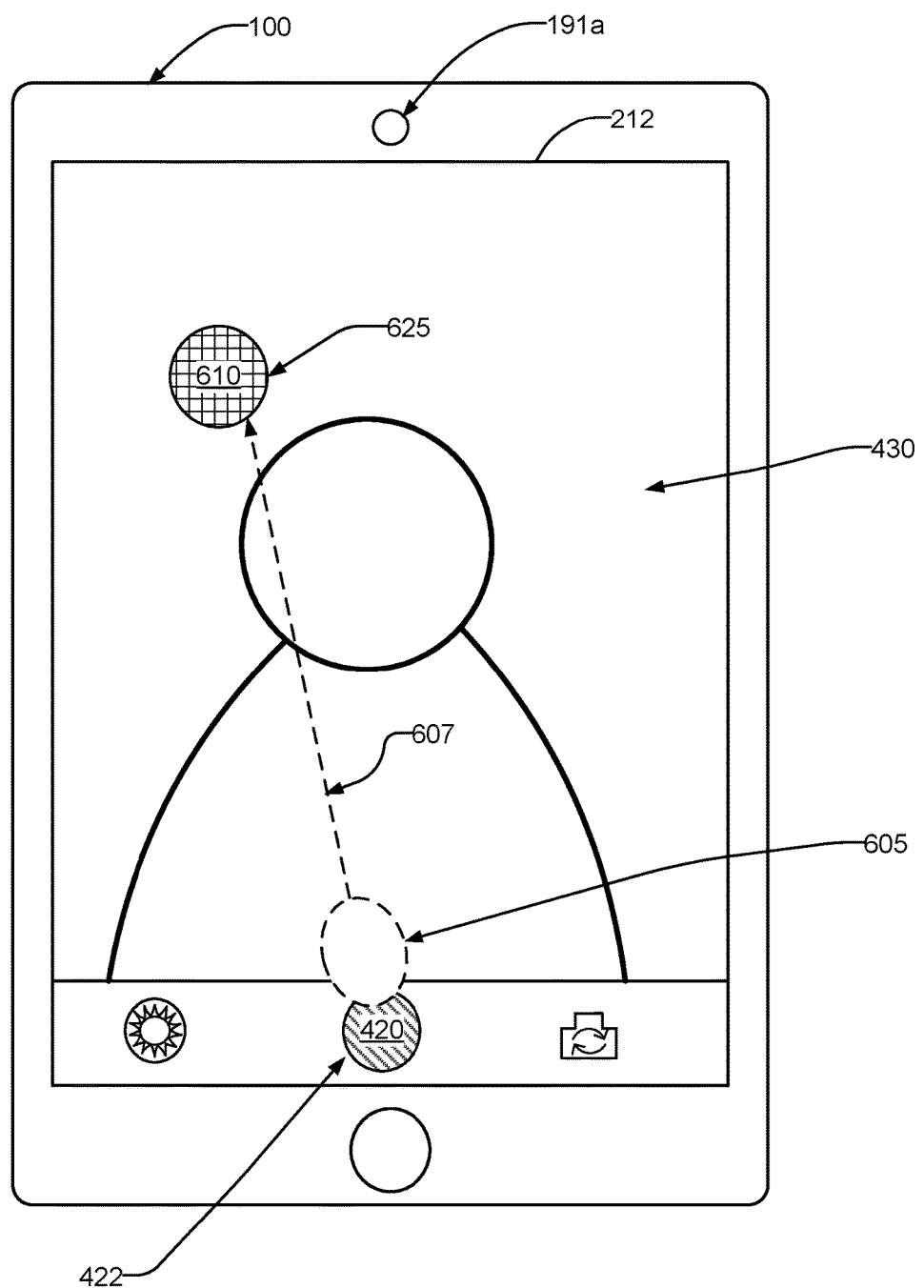
FIG. 6B illustrates an example user interface of the camera application displaying the second shutter button at the second location in response to the input to move the second shutter button on a touch-sensitive display of an electronic device.

FIG. 6B illustrates an example user interface of the camera application 248 displaying the second shutter button 610 at the second location 625 in response to the input to move the second shutter button 610 on a touch-sensitive display of an electronic device. While the second shutter button 610 is moved to the second location 625, the image 430 received from the camera 191 is displayed within the camera view and the shutter button 610 is displayed over the displayed image. In one embodiment, the representation of the shutter button 610 is changed to be translucent such that the displayed image is visible through the shutter button 610. While the shutter button 610 is at the second location 625, a second touch input is detected on the second shutter button 610. The camera application again determines whether the input is an input to activate or move the second shutter button 610. In response to the former, the camera application 248 captures the displayed image and stores it the memory 202. In response to the latter, the camera application 248 moves the second shutter button to a further, user selected location.

Alternatively, the camera application 248 determines that the first touch input 605 indicates an input to create a second shutter button, and then to move the first shutter button to a second location while the second shutter button is at the first location. In response thereto, the camera application 248 creates the second shutter button at the first location and then separately moves the first shutter button to the second location. Similarly, a second touch input may be detected on the first shutter button 420 at the second location 625. Similar to the embodiment described above, the camera application 248 determines the whether the second touch input is to activate or move the shutter button 420 and responds accordingly.

Once the second shutter button 610 has been created and moved, there are several options for managing its persistence. In one embodiment, the second shutter button 610 remains at the second location 625 until the camera application 248 is exited; upon the next execution of the camera application 248 only the first shutter button 420 is shown until the user attempts to move the first shutter button 420. Alternatively, second shutter button 610 can be persisted using the second location 625 as its default location, so that the next time the camera application 248 is executed, the first shutter button 420 is displayed at the first location 422 and the second shutter button 610 appears immediately at the second location 625. From that second location 625, the second shutter button 610 can be further moved to any desired location. Whether the second shutter button 610 is removed is persisted at the second location 625 can be configured by a user setting indicating whether or not to retain the second shutter button 610 at its last used position (i.e., the second location 625).

Third Embodiment: Two Shutter Buttons

Figure 6C:
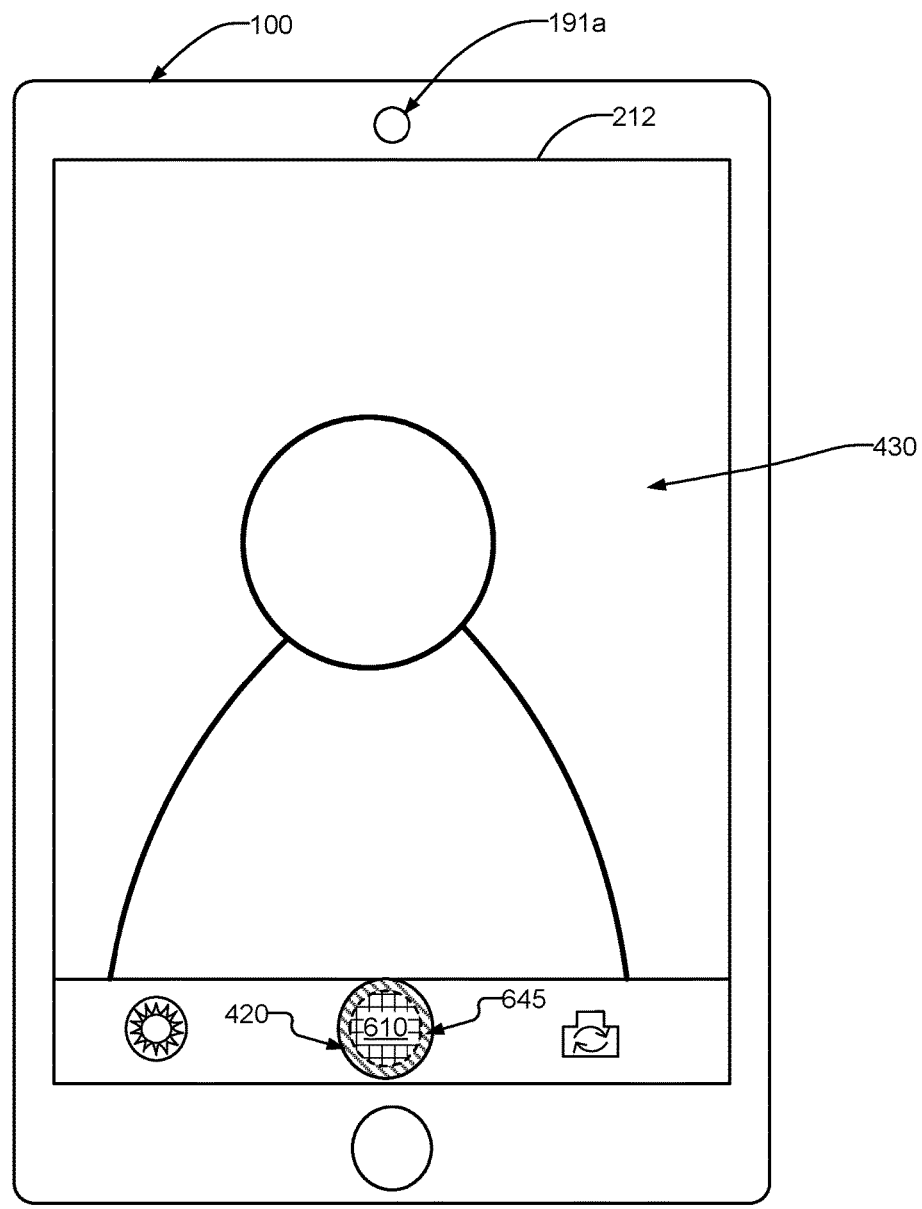
FIG. 6C illustrates another example user interface of the camera application displaying two shutter buttons on the touch sensitive display of an electronic device.

FIG. 6C illustrates another example user interface of the camera application displaying two shutter buttons on the touch sensitive display of an electronic device. In this embodiment, a first shutter button 420 is displayed at a first location (e.g. center of the camera control panel 455) on the touch-screen display 212. Additionally, a second shutter button 610 is displayed at a location that overlaps with the first location. A location is a set of pixels defined within a boundary on the touch-sensitive display 212. In one variation of this embodiment, a subset of pixels of the location of the first shutter button 420 overlaps with the set of pixels of the location of the second shutter button 610, such that some portion 645 of the first shutter button 420 at the first location is visible to a user, indicating that the second shutter button 610 is overlaid on top the first shutter button 420. In this embodiment, the second shutter button 610 is movable and can be moved to a second location within the camera view on the touch-sensitive display 212. The first shutter button 420 is stationary and remains at the first location on the touch-sensitive display 212. In another embodiment, the first shutter button 420 is movable as is the second shutter button 610.

The representation of the first shutter button 420 is different than the second shutter button 610 so that each shutter button is visible to a user of the camera application 248. For example, the second shutter 610 button may be of a different color than the first shutter button 420, or a second shutter button 610 may be represented with a fill while the first shutter button 420 may be represented by an outline of the button or other graphically distinguished appearance.

Figure 6D:
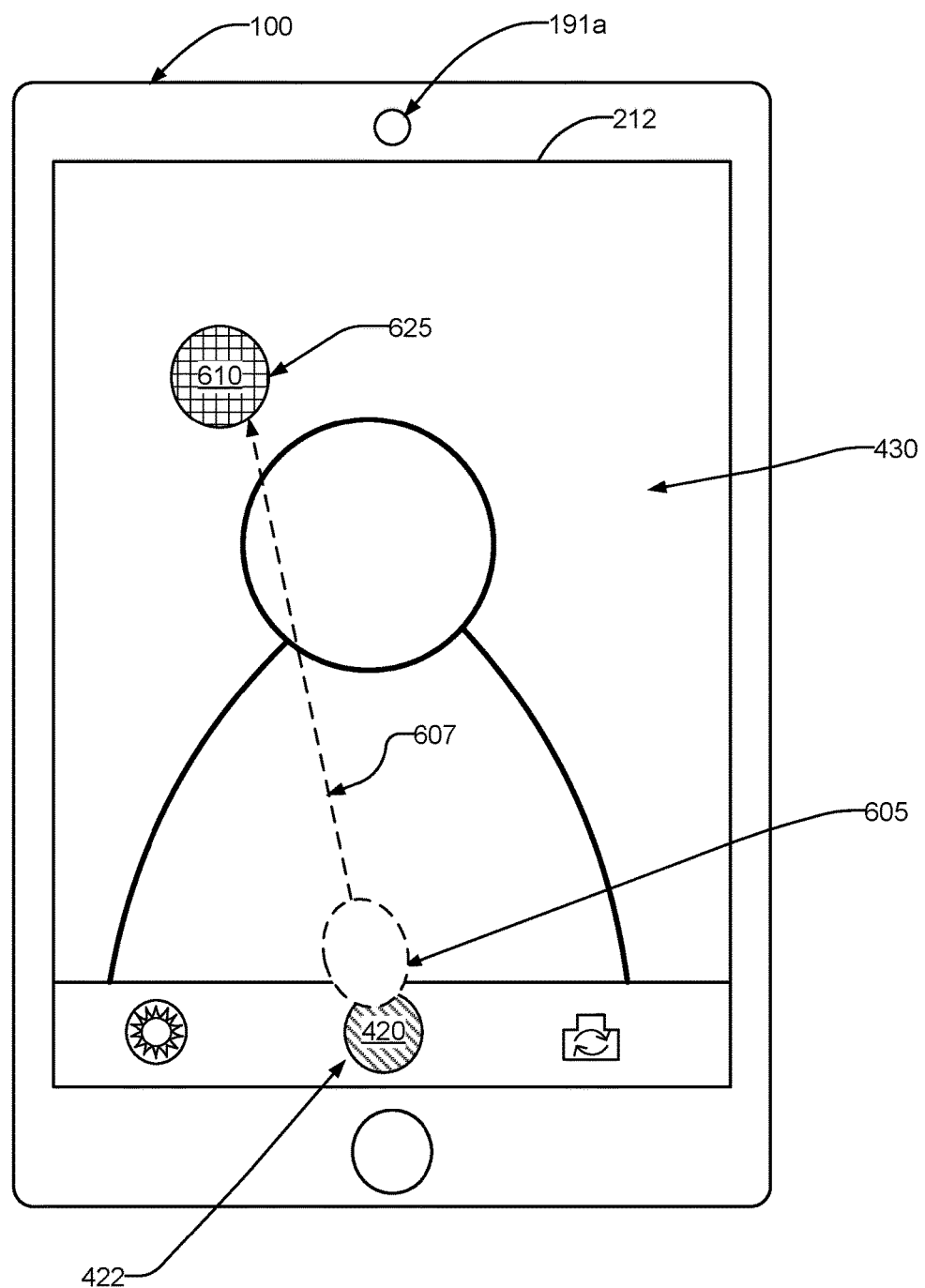
FIG. 6D illustrates an example user interface of the camera application, and the receipt of a touch input gesture to move one of the two shutter buttons on a touch-sensitive display of an electronic device.

FIG. 6D illustrates another example user interface of the camera application with two shutter buttons, and the receipt of a touch input gesture to move one of the two shutter buttons on a touch-sensitive display of an electronic device. As in FIG. 6C, while the first shutter button 420 and the second shutter button 610 are displayed at the first location, a first touch input 605 is detected on the second shutter button 610. In this example, the first touch input 605 is again a drag gesture that starts at the first location, continues with a motion 607 and ends at a second location 625 anywhere within the camera view on the display 212. The touch input 605 is processed by the motion module 232 as previously described, which receives the touch input locations and parameters (speed, direction, etc.) and passes this data to the camera application 248.

The camera application 248 determines whether the first touch input 605 indicates to an input to move the second shutter button 610, or a request to activate the second shutter button 610. In response to the former, the camera application 248 moves the shutter button 610 to the second location 625. In response to the latter, the camera application 248 captures the images 430.

While the second shutter button 610 is moved to the second location, the image 430 received from the camera is displayed within the camera view and the shutter button 610 is displayed over the displayed image. In one embodiment, the representation of the shutter button 610 is changed to be translucent such that the displayed image is visible through the shutter button 610. While the shutter button 610 is at the second location 625, a second touch input is detected on the second shutter button 610. Additionally, a second touch input may be detected on the first shutter button 420 at the first location. The camera application 248 determines whether the second touch input on the shutter button at the first location or the second location indicates an input to capture an image or an input to move the shutter button. In response to the former, the camera application 248 captures the displayed image and stores it the memory 202.

The persistence of the second shutter button 610 of this embodiment may be managed as described above with respect to the second embodiment.

With respect to the first, second and third embodiments, the availability of the movable shutter, or second shutters may be controlled by a setting in camera application 248 to activate or deactivate the feature.

Fourth Embodiment: Activation of Camera Control Settings

Figure 7:
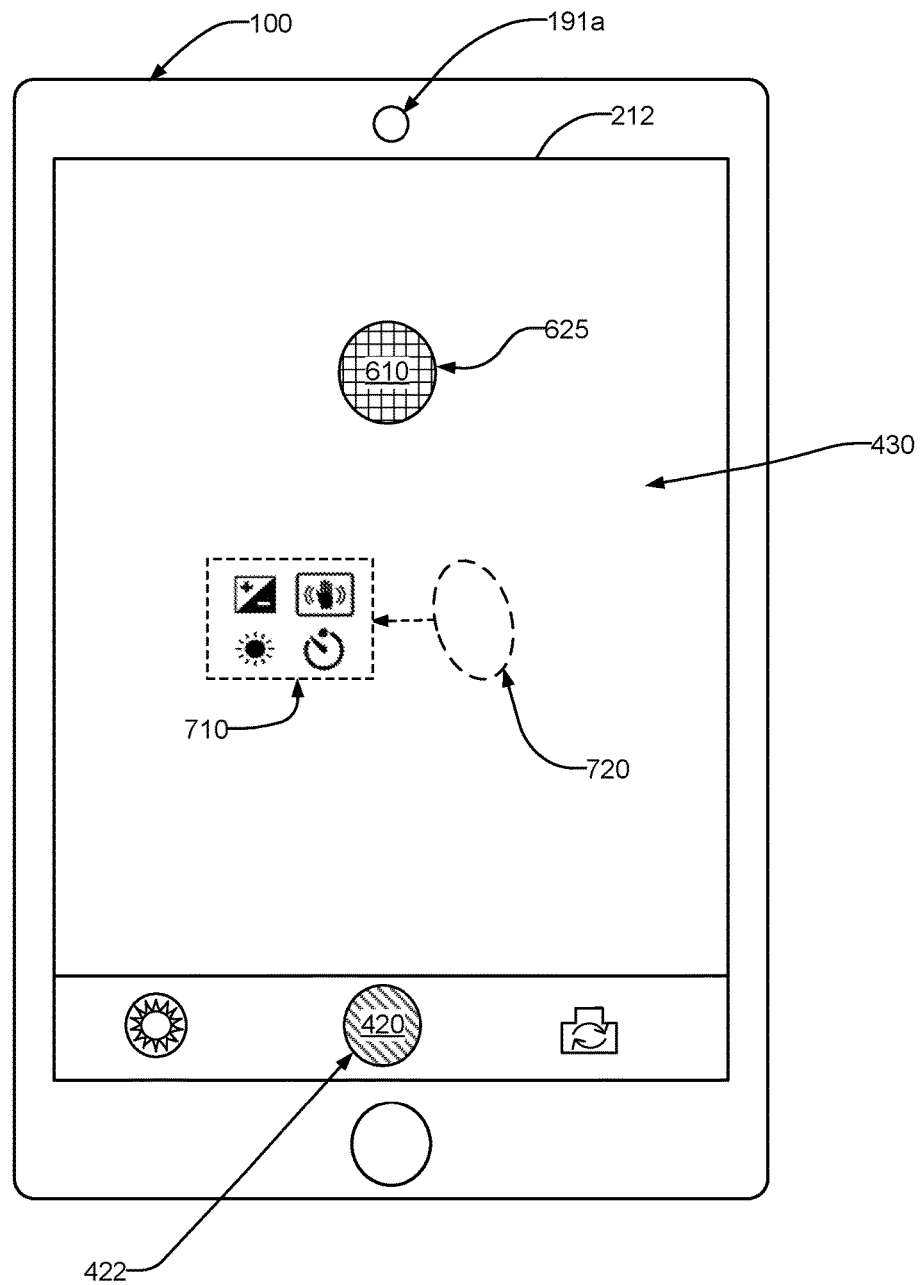
FIG. 7 illustrates an example user interface of the camera application that includes a camera control settings icon on the touch-sensitive display of an electronic device.

FIG. 7 illustrates an example user interface of the camera application 248 that includes a camera control settings icon 710 on the touch-sensitive display 212 of an electronic device. In all of the embodiments described above, while the first shutter button 420 is displayed at the first location 422 and the second shutter button 710 is displayed at the second location 625, a touch input 720 is detected at a third location within the camera view of the camera application. In this example, the touch input 720 is a tap gesture at a third location on the display 212 that is different than the first location 422 or the second location 625. The motion module 232 detects the tap gesture by detecting a finger-down event followed by a finger-up (lift off) event at the same position, i.e. at the third location on the touch-screen display 212. On detecting the touch input 720, the motion module 232 receives the touch input locations and parameters (speed, direction, etc.) and passes this data to the camera application 248. Alternatively, the touch input 720 may be a different gesture that occurs at the third location, such as a long press or a double tap, and the motion module 232 detects these gestures accordingly.

The camera application 248 determines that the touch input 720 indicates an input to display a camera control settings icon 710, since the gesture includes a tap at the third location on the touch sensitive display 212 when the second shutter button is at the second location and the first shutter button is at the first location. In response thereto, the camera application 248 creates and displays a camera control settings icon 710 that further includes a set of icons representing a variety of features of the camera such as exposure compensation, shutter speed, manual focus and other such features. The camera control settings icon 710 allows a user to adjust these camera features.

Fifth Embodiment: Automatic Camera Selection Upon Movement of Shutter Button

Electronic devices with two cameras, such as a front facing camera 191*a* and a rear facing camera 191*b* typically set the rear facing camera 191*b* as the default camera that is used when the camera application 248 is accessed. To switch which camera is active, the user selects the camera selection button 415. As a further beneficial embodiment, the detection of an input to move the shutter button 420 can be utilized to automatically select which camera 191 is activated. For example, the front facing camera 191*a* may be automatically selected.

In one example of this embodiment, a shutter button 420 is displayed at a first location 422 (e.g. center of the camera control panel 455) on the touch-screen display 212. While the shutter button 420 is displayed, a first touch input 505 is detected on the shutter button 420 at the first location 422. The touch input 505 is processed by the motion module 232, which receives the touch input locations and parameters (speed, direction, etc.) and passes this data to the camera application 248.

The camera application 248 determines whether the first touch input 505 indicates to an input to move the shutter button 420 or an input to activate the shutter button 420. As in the above embodiments, the determination that the gesture is an input to move the shutter button 420 can be based on the first touch input 505 being a drag gesture that starts at the first location 422 and continues with a motion 507 that ends at a second location 510 anywhere within the camera view on the display 212. In response to determination that the first touch input is an input to move the shutter button 420, the camera application 248 determines which camera is enabled, i.e. a front facing camera 191*a* or the rear camera 191*b* via a camera setting within the camera application 248. Responsive to determining that a rear camera 191*b* is enabled, the camera application 248 switches to the front facing camera 191*a*. If a front facing camera 191*a* is enabled, the camera application 248 does not switch the camera lens.

In response to the first input being an input to move the shutter button 420 and the rear camera 191*b* switch to the front facing camera 191*a*, the camera application 248 moves the shutter button 420 to the second, user selected, location 510. While the shutter button 420 is moved to the second location, the image 430 received from the front facing camera 191*a* is displayed within the camera view and the shutter button 420 is displayed over the displayed image 430. In one embodiment, the representation of the shutter button 420 is changed to be translucent such that the displayed image is partially visible through the shutter button 420.

While the shutter button 420 is at the second location 510, a second touch input, is detected on the shutter button 420. The camera application 248 determines whether the second touch input on the shutter button 420 indicates an input to capture an image or an input to move the shutter button 420 to a further user selected location. If the camera application 248 determines that the second touch is an input to move the second shutter button, such as those previously described, the second shutter button is moved to another user selected location, based on the parameters of the input. If the camera application 248 determines that the input is an input to activate the shutter button 420 (e.g. a tap input), the camera application 248 captures the displayed image and stores it the memory 202.

In this example, detection of an input gesture to move the shutter button 420 is used to automatically activate the front facing camera 191*a*. The designation of which camera (front or rear facing) to activate upon of the input gesture can be set in a configuration interface of the camera application 248. That is, the camera application 248 can include a user interface control panel in which the user can select which camera (front facing 191*a* or rear facing 191*b*) is to be automatically selected.

Figure 8A:
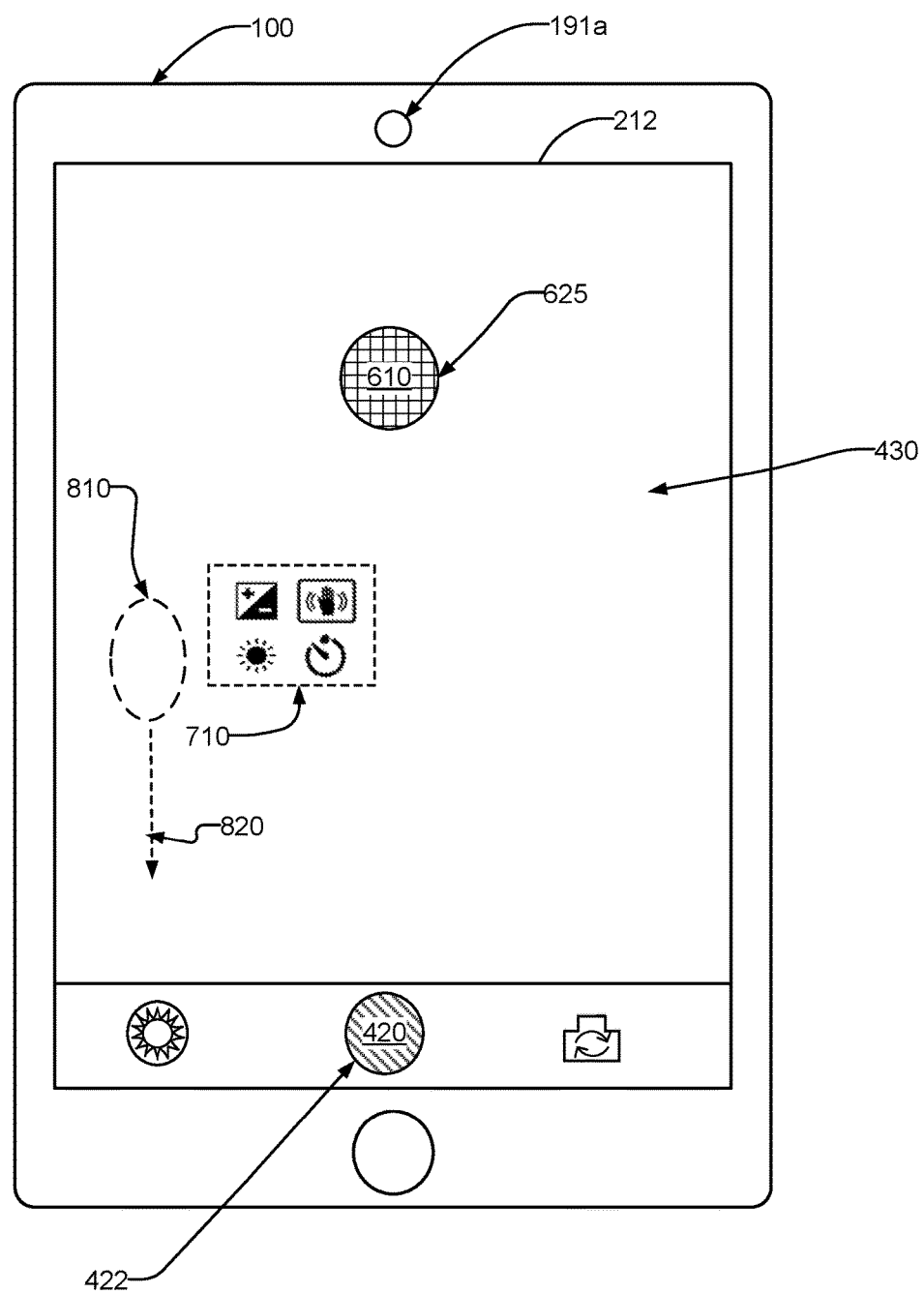
FIG. 8A-8B illustrates an example user interface of the camera application and a receipt of a touch input gesture to control camera settings using the control settings icon on the touch-sensitive display of an electronic device.
Figure 8B:
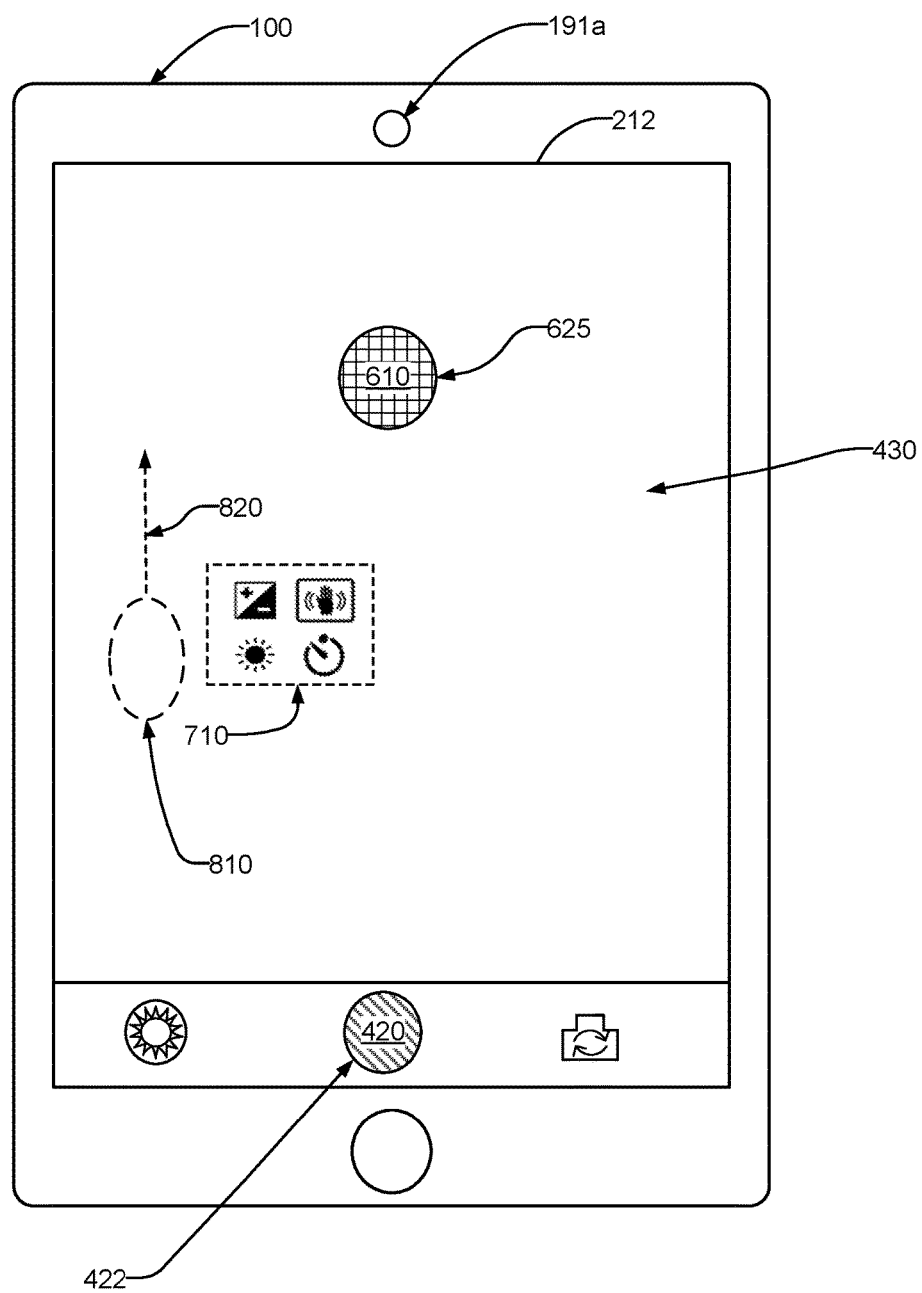

FIG. 8A-8B illustrates an example user interface of the camera application and a receipt of a touch input gesture to control camera settings using the control settings icon on the touch-sensitive display of an electronic device. While the camera control settings icon 710 is displayed at a third location, selection of a camera control is detected from a tap input on one of the icons within the camera control settings icon 710. While a camera control is selected, a touch input gesture 810 is detected at a location proximal of the camera control settings icon 710. The touch input 810 is a long press gesture that continues with a motion 820 in either an upward direction or a downward direction from the proximal location on the display 212. The motion module 232 detects the long press gesture by detecting a finger-down event at a location proximal to the camera control settings icon, followed by a slide or drag gesture in an upward or downward direction, followed by a finger dragging event across a continuous series of locations in the upward or downward direction on the touch screen display 212, and subsequently followed by detecting a finger-up (lift off) event.

The touch input 810 is detected by the motion module 232 that receives the touch input locations and parameters (speed, direction, etc.) and passes this data to the camera application 248. The camera application 248 determines that the touch input 810 indicates an input to adjust a camera feature, for example, a motion 820 in an upward direction is an input to increase a shutter speed, or a camera exposure or any other feature of the camera 191 available for selection from the camera control settings icon 710. A motion 820 in a downward direction is an input to decrease a shutter speed, or a camera exposure or any other feature of the camera 191 available for selection from the camera control settings icon 710. In response thereto, the camera application 248 adjusts the camera feature.

Figure 9A:
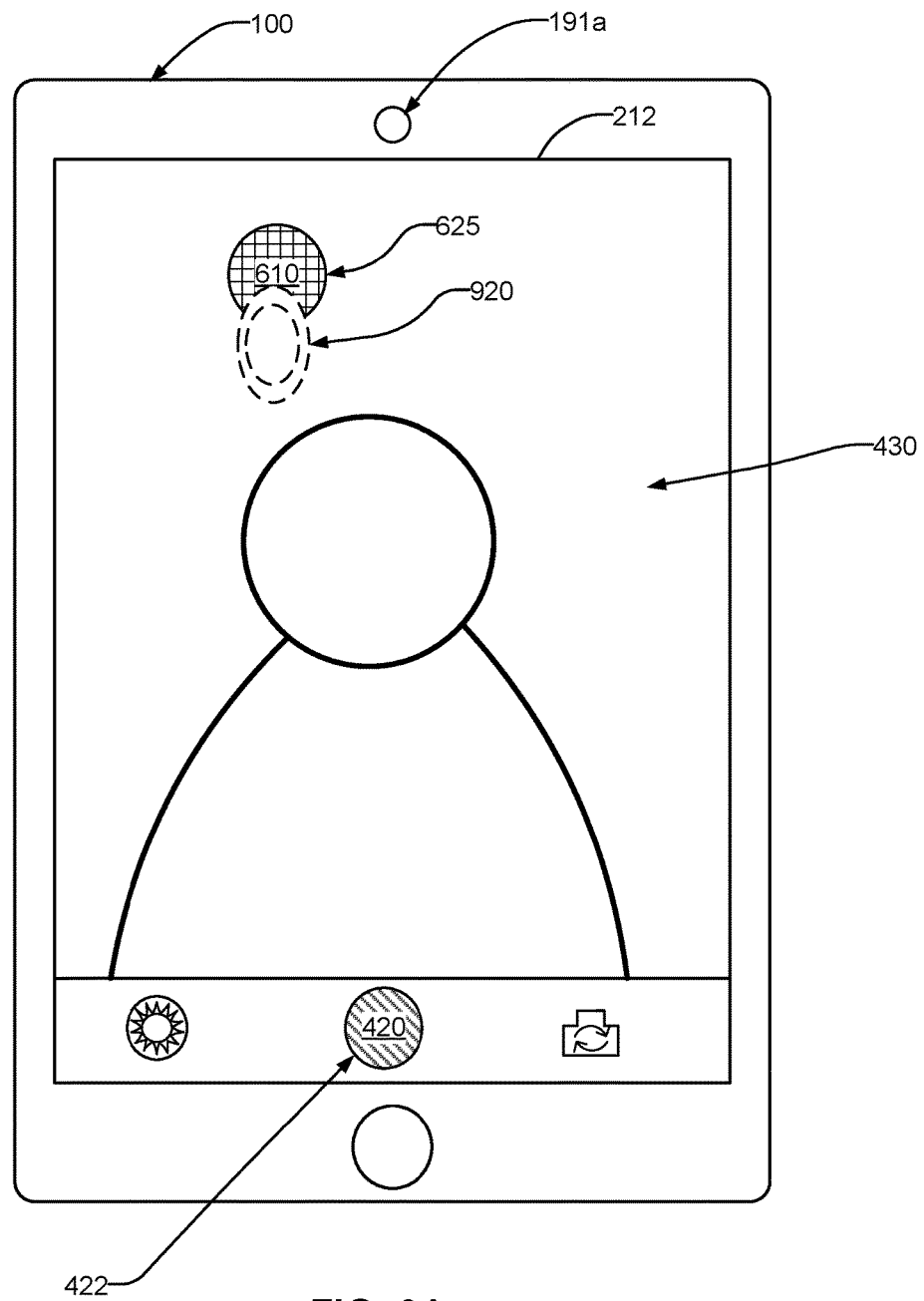
FIG. 9A-9B illustrates an example user interface of the camera application and a receipt of a long press gesture on the movable shutter button to start/stop recording a video on the electronic device.
Figure 9B:
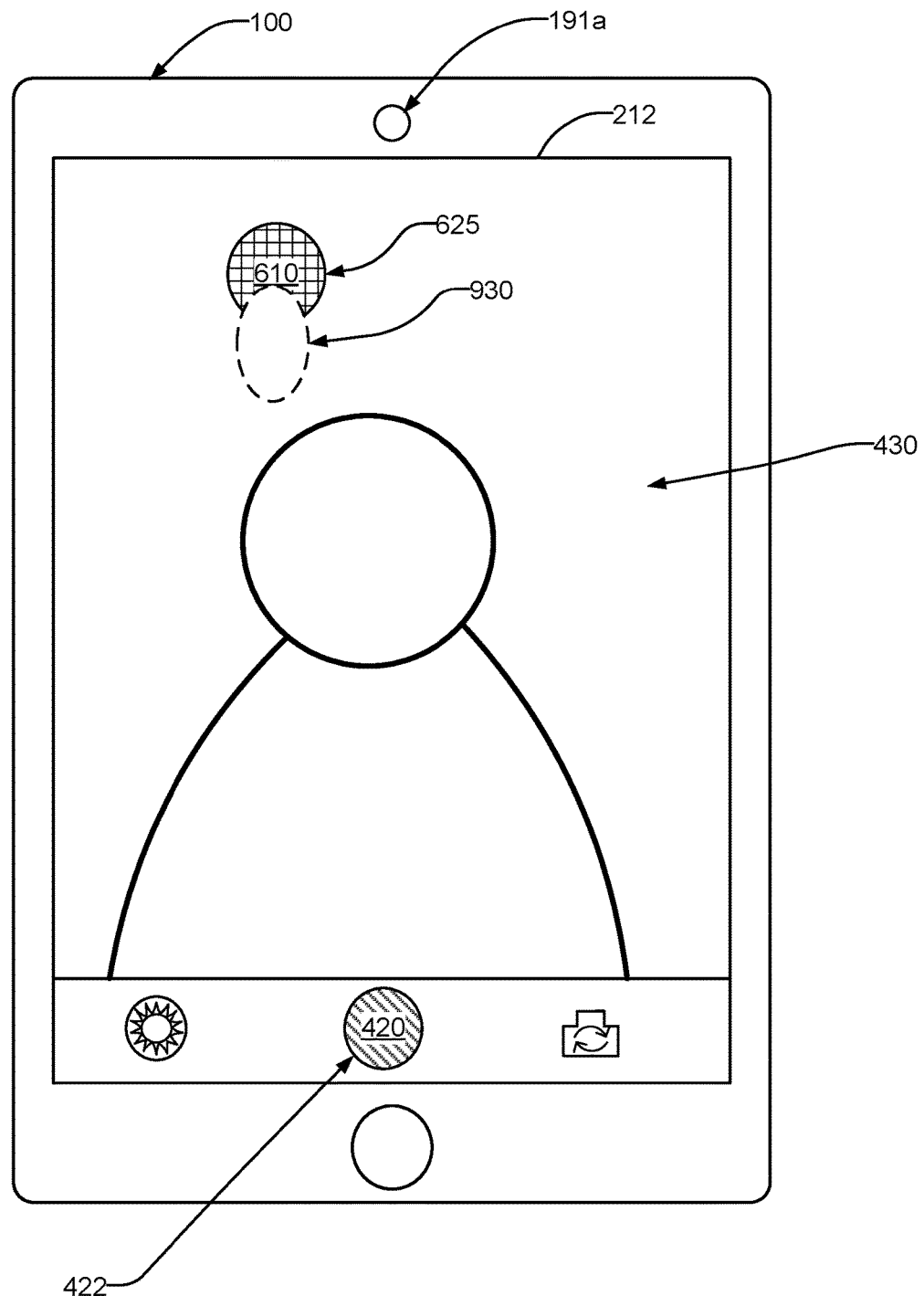

FIG. 9A-9B illustrates an example user interface of another embodiment of the camera application. In this embodiment, a long press gesture on the movable shutter button is input to start/stop recording a video on the electronic device, rather than an input to either move the shutter or activate it to capture a still image. In all of the embodiments described above, while the first shutter button 420 is displayed at the first location 422 and the second shutter button 610 is displayed at the second location 625, the image 430 received from the camera is displayed within the camera view and the second shutter button 625 is displayed over the displayed image.

While the image 430 is displayed, a touch input 920 is detected on the second shutter button 610 at the second location 625. In this embodiment, the touch input 920 is a long press gesture that is held for a pre-determined period of time, for example, pressing the second shutter button for one second on the display 212. The motion module 232 detects the long press gesture by detecting a finger-down event to depress the second shutter button and holding the second shutter button in the depressed state for a predetermined period of time such as one second and subsequently followed by detecting a finger-up (lift off) event.

The touch input 920 is detected by the motion module 232 and following the detection, the motion module 232 receives the touch input locations and parameters (speed, time, etc.) and passes this data to the camera application 248. The camera application 248 determines that the touch input 920 is a long press gesture on the shutter button for the predetermined period of time indicating an input to start capture of a video stream using the camera. In response hereto, the camera application 248 starts capturing a video using the camera 191*a*. The camera application 248 may set a flag to indicate that capturing a video is in progress and forward the status of the flag to the motion module 232. On receiving the indication via the status flag that a video capture is in progress, the motion module 232 may disable detection of some touch input gestures, for example, detection of the touch input gesture to display camera control settings icon.

While the first shutter button 420 is displayed at the first location 422 and the second shutter button 610 is displayed at the second location 625, and a video stream is being captured using the camera 191*a*, a touch input 930 is detected on the second shutter button 610 at the second location 625. The touch input 930 is a tap gesture on the second shutter button 610 on the display 212.

The touch input 930 is detected by the motion module 232 and following the detection, the motion module 232 receives the touch input location and parameters (speed, time, etc.) and passes this data to the camera application 248. On receiving the touch input location and parameters, the camera application 248 determines that a video stream capture is in progress, and hence the touch input 930 on the second shutter button 610 indicates an input to stop capture of the video stream. In response hereto, the camera application 248 stops capturing the video and stores the video stream to the memory 202.

Alternatively, the touch input gestures 920, 930 for starting or stopping a video capture may be detected on the first shutter button 420 at the first location 422. In some embodiments, a touch input gesture 920 indicating an input to start capturing a video stream is detected on a second shutter button 610 at the second location 625 and the touch input gesture 930 indicating an input to stop the capture of the video stream is detected on the first shutter button 420 at the first location 422.

Example Implementation

Figure 10:
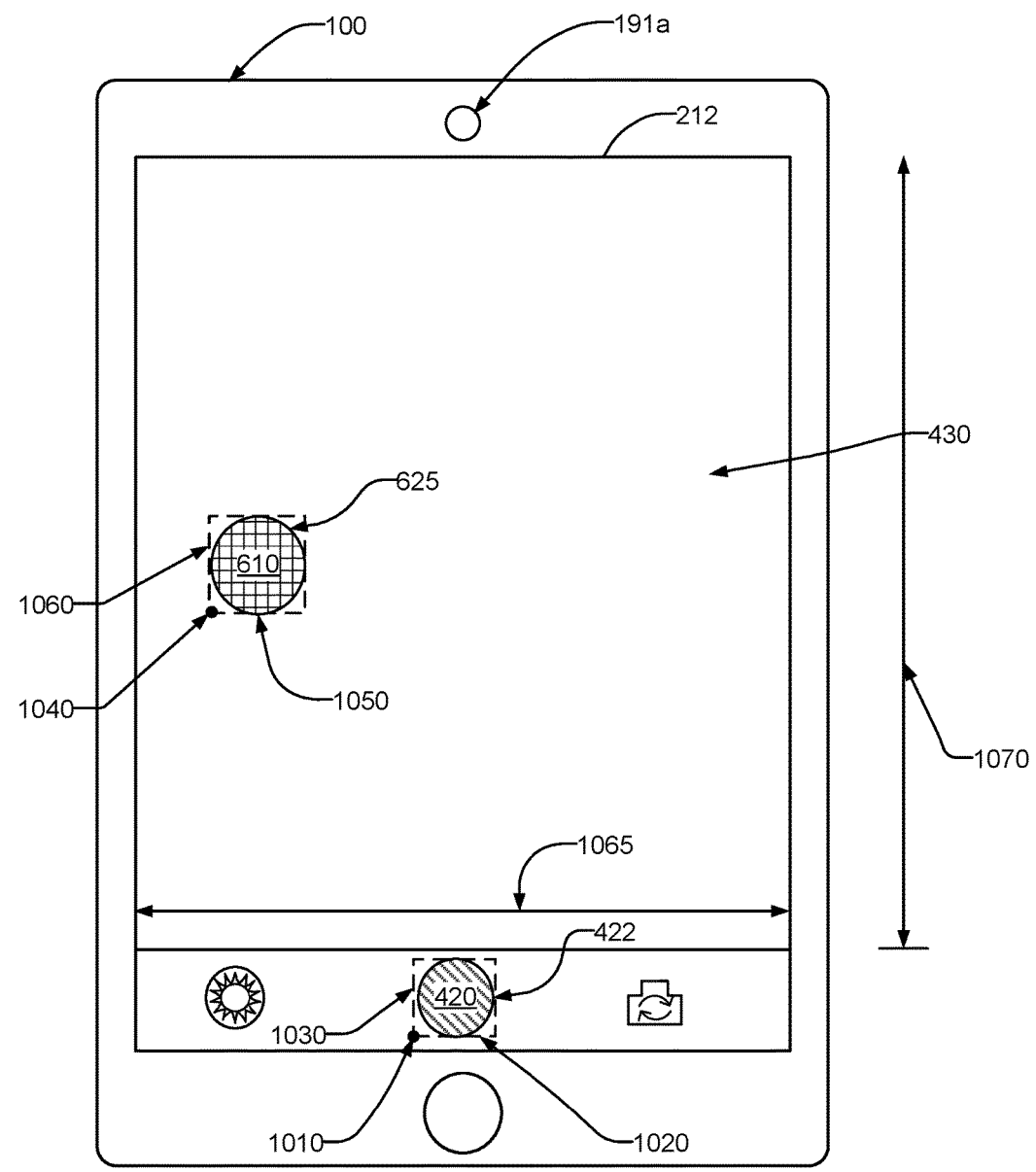
FIG. 10 illustrates an example user interface of the camera application displaying a boundary of a first location and a second location of the shutter button on the touch-sensitive display of an electronic device.

FIG. 10 illustrates an example user interface of the camera application displaying a boundary of a first location and a second location of the shutter button so as to explain how the camera application determines to move or create a shutter button. The location of the shutter button includes a set of pixels defined within a boundary represented by a rectangular frame. The rectangular frame is shown here for explanation purposes only, and in operation is not visible to the user, as shown in the previous figures. The display screen 212 has a screen width 1065 and a screen height 1070. The rectangular frame of the first shutter button 420 includes an origin point 1010, a width 1020 (i.e. horizontal boundary) and a height 1030 (i.e. a vertical boundary). The origin point 1010 is a pixel (x, y) represented by an x co-ordinate and a y co-ordinate determined based on the size of the display screen 212. For example, if the display screen size is 420×528, i.e. a screen width of 420 pixels and a screen height of 528 pixels, and the first shutter button is located at the center of the bottom panel, the first shutter button will originate at pixel (110, 523). The rectangular frame of the first location originates at the origin point at (110, 523), a frame width of 100 pixels and a frame height of 100 pixels. Thus, the set of pixels included within the boundary represented by (110, 423), (110, 523), (210, 423) and (210, 523) form the first location 422 that includes the first shutter button 420.

When a camera application 248 determines an input to move the shutter button 420 from a first location 422 to a second location 625 based on a touch input gesture, the motion module 232 receives the last position of the touch input, for example, a pixel location 1040 (50, 290). Based on the last position of the touch input, the frame width (i.e. 100 pixels) and frame height (i.e. 100 pixels) of the shutter button 420, the camera application 248 determines the set of pixels included within the rectangular frame of the second shutter button 610. Continuing the example above, the set of pixels included within the boundary represented by (50, 190), (150, 190), (50, 290) and (150, 290) form the second location 625 that includes the second shutter button 610. Once the camera application 248 determines the set of pixels for the second location, the second shutter button 610 is moved to the second location 625.

Figure 11A:
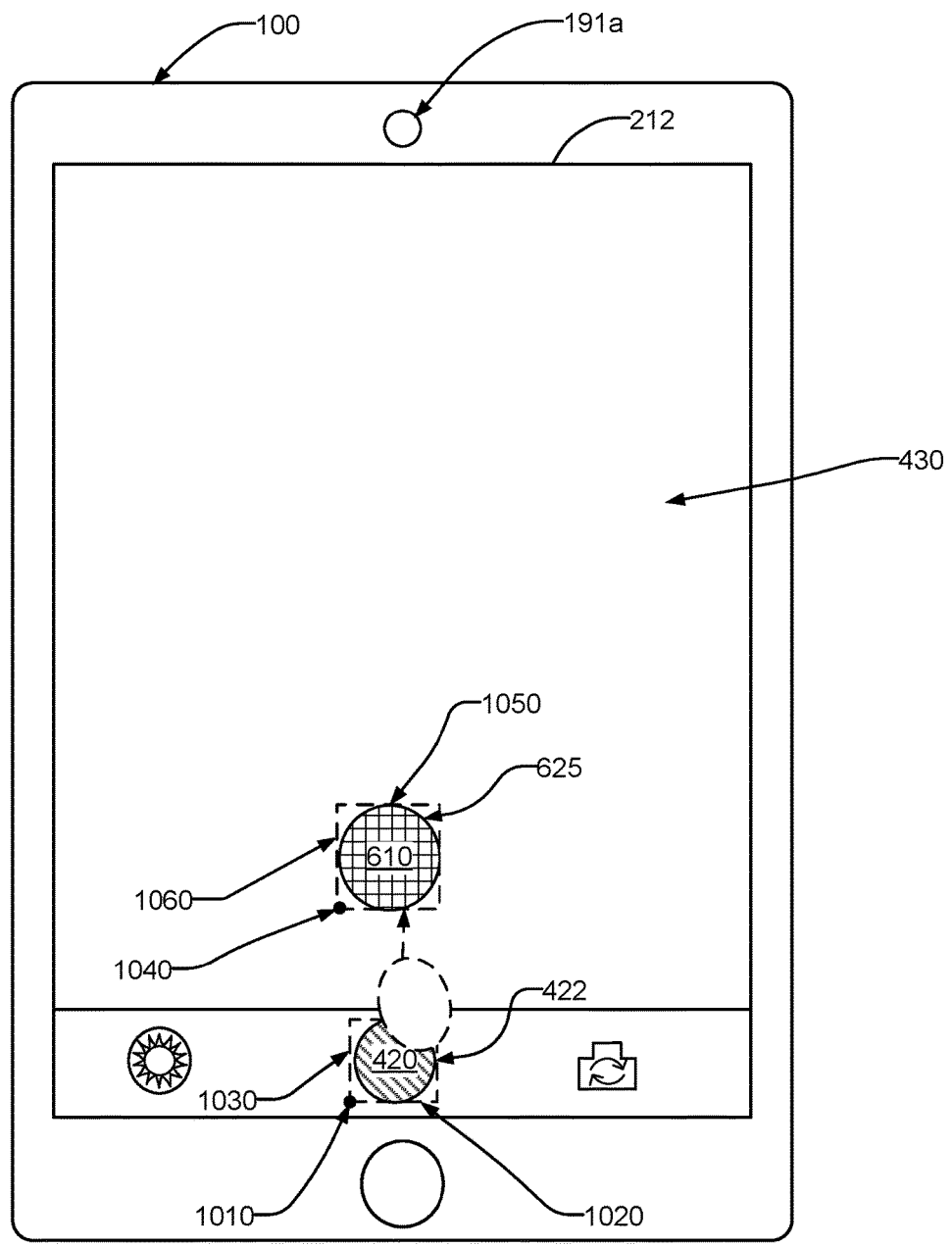
FIG. 11A-11B illustrates an example user interface of the camera application that includes displaying an animation to relocate the second shutter button from the second location to a first location when the first shutter button in close proximity of the second shutter button on the touch-sensitive display of an electronic device.
Figure 11B:
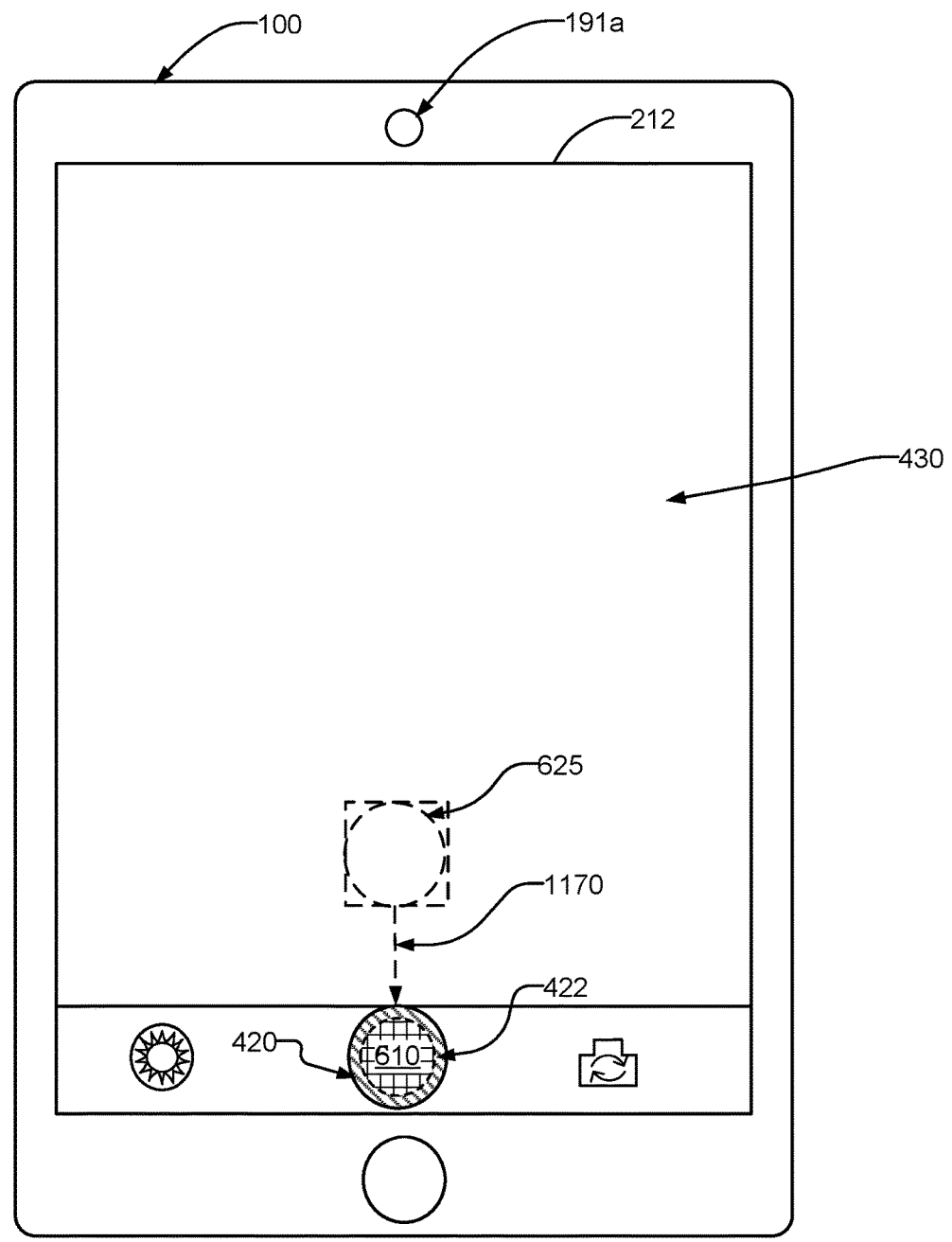

FIG. 11A-11B illustrates an example user interface of the camera application that includes displaying an animation to relocate the second shutter button from the second location to a first location when the first shutter button in close proximity of the second shutter button on the touch-sensitive display of an electronic device. When a camera application 248 determines an input to move the shutter button 420 from a first location 422 to a second location 625 based on a touch input gesture, the motion module 232 receives the last position of the touch input, for example, a pixel location 1040 (100, 450) and sends it to the camera application 248. Based on the origin point 1040 of the second location 625, the camera application 248 determines the set of pixels included within the rectangular frame of the second shutter button 610. For example, the set of pixels included within the boundary represented by (100, 350), (100, 450), (200, 450) and (200, 350) form the second location 625 that includes the second shutter button 610. The x-axis value of one of the pixel location defining the boundary of the second location 625 is compared to the corresponding pixel location defining the boundary of the first location 422. Similarly, the y-axis value of one of the pixel location defining the boundary of the second location 625 is compared to the corresponding pixel location defining the boundary of the first location 422. If the pixel of the second location is within a predetermined number of pixels of the first location, the second shutter button 625 is animated back 1170 to the first location 422. Animation may include sliding the shutter button back to the first location from the second location or from the last position of the touch input.

Continuing the example above, if the predetermined number of pixel difference is set to 90 pixels, i.e. if the second location is within 90 pixels of the first location, the second location is in proximity to the first location. The x-axis value of the pixel (100, 450) of the second location is compared to the x-axis value of the pixel (110, 523) of the first location, i.e. 100 is compared to 110, and the difference is 10 pixels. The y-axis value of the pixel (100, 450) of the second location is compared to the y-axis value of the pixel (110, 523) of the first location, i.e. 450 is compared to 523, and the difference is 73 pixels. Both the values are within the predetermined number of pixel difference and hence the shutter button is animated back 1170 to the first location.

Figure 12A:
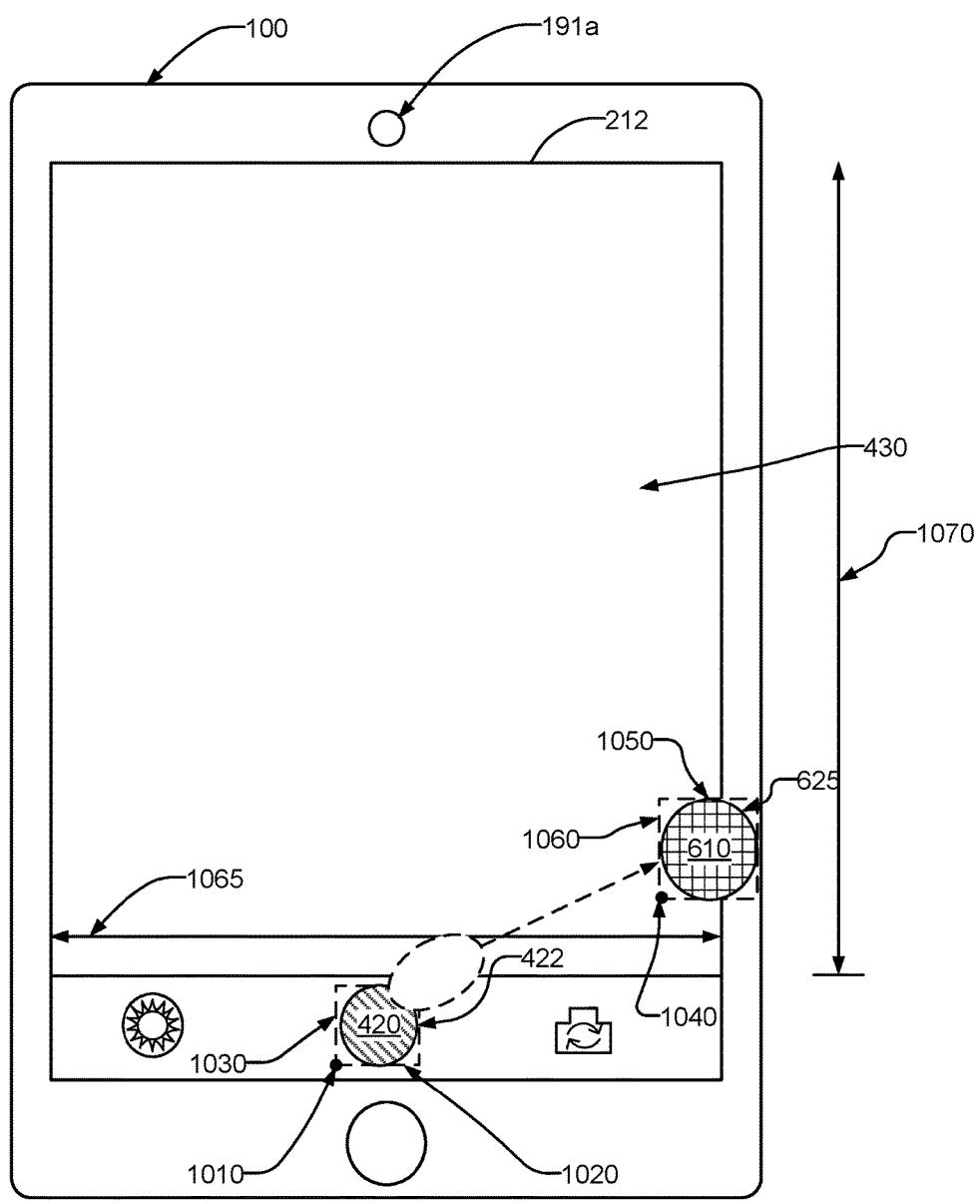
FIG. 12A-12B illustrates an example user interface of the camera application that includes displaying an animation to relocate the second shutter button from the out of bounds location of the camera view to a first location on the touch-sensitive display of an electronic device.
Figure 12B:
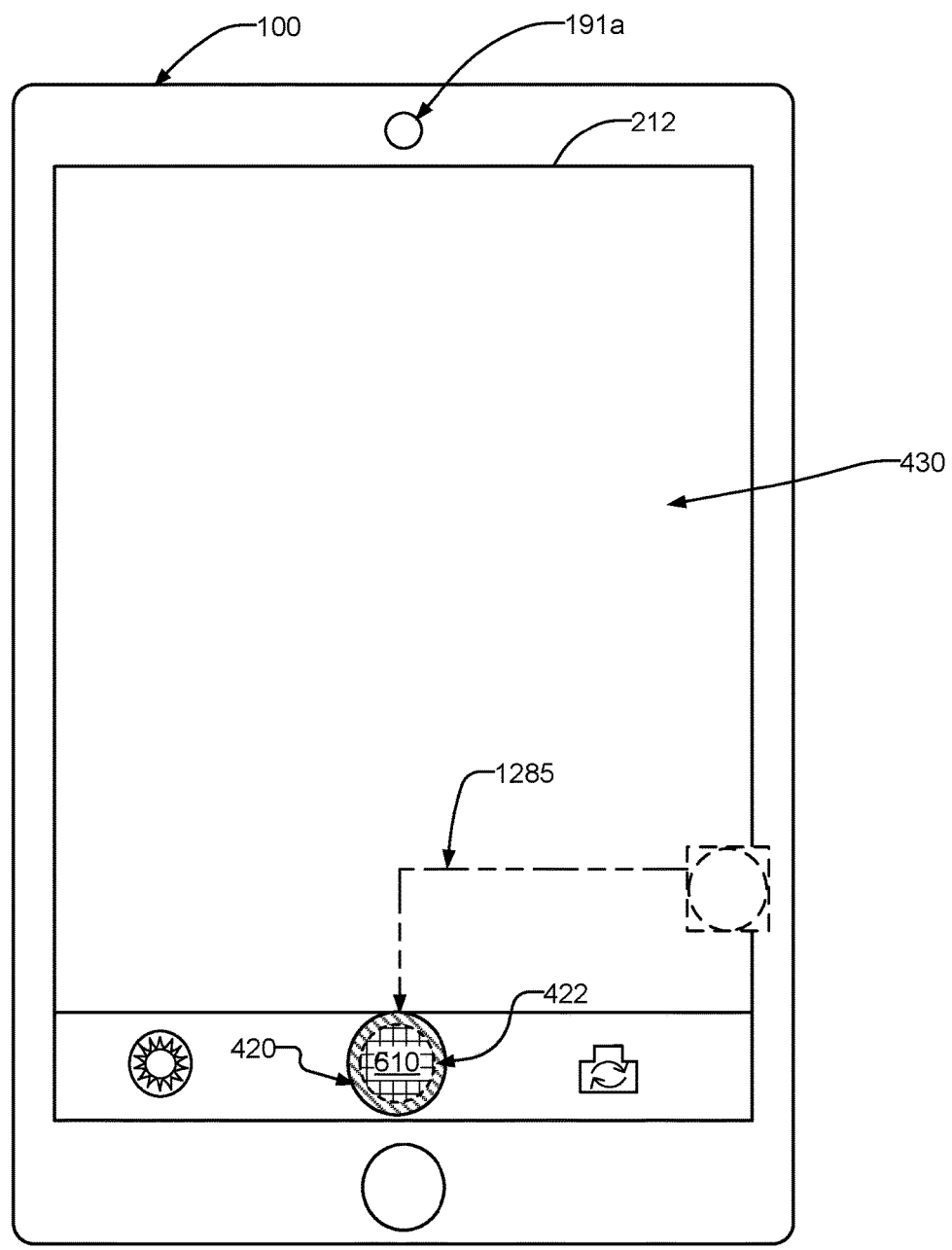

FIG. 12A-12B illustrates an example user interface of the camera application that includes displaying an animation to relocate the second shutter button from the out of bounds location of the camera view to a first location on the touch-sensitive display of an electronic device. When a camera application 248 determines an input to move the shutter button 420 from a first location 422 to a second location 625 based on a touch input gesture, the motion module 232 receives the last position of the touch input, for example, a pixel location 1040 (300, 500) and sends it to the camera application 248. Based on the origin point 1040 of the second location 625, the camera application 248 determines the set of pixels included within the rectangular frame of the second shutter button 610. For example, the set of pixels included within the boundary represented by (300, 500), (300, 400), (400, 400) and (400, 500) form the second location 625 that includes the second shutter button 610.

The x-axis value of each of the pixel location defining the boundary of the second location 625 is compared to the screen width 965. Similarly, the y-axis value of each of the pixel location defining the boundary of the second location 625 is compared to screen height 1070. If the x-axis value of any one of the pixels of the second location is out of bounds of the screen width 1065, the second shutter button 625 is animated back 1285 to the first location 422. Similarly, if the y-axis value of any one of the pixels of the second location is out of bounds of the screen height 1070, the second shutter button 625 is animated back 1285 to the first location 422. Animation may include sliding the shutter button back to the first location from the second location or from the last position of the touch input.

Continuing the example above, the screen width 1065 is 420 pixels and the screen height 1070 is 528 pixels. The x-axis value of each pixel of the boundary of the second location is within 300 to 400. 300 is compared to the screen width 420, and 400 is compared to the screen width 420 pixels. One of the pixels (300, 400) at the boundary of the second location is out of bounds of the screen width. Similarly, for the y-axis comparisons, the value 400 and 500 is compared to 528 pixels. The y-axis value of each pixel at the boundary of the second location is within the bounds of the screen height 1070. Since, one of the pixel violates the screen width constraint, the second shutter button 625 is animated back 1285 to the first location 422.

Methods of Operation

FIG. 13 is a method flow diagram 1300 for capturing an image with the camera using a movable single shutter button. When executing a camera application 248 on an electronic device 100, a camera view is displayed 1305 including a shutter button at a first location on the touch-sensitive display 212 of the electronic device. The first location is generally located at the center of a bottom panel 455 within a camera view of the camera application 248. While the shutter button is displayed at the first location, the motion module 232 detects 1310 a first touch input on the shutter button on the touch sensitive display 212. The first touch input is a slide gesture or a drag gesture that starts at a first location, continues along a series of location to a second location on the touch screen display 212. The motion module 232 receives location and parameters such as speed, time, etc. for the touch input and forwards it to the camera application 248. The camera application 248 determines 1315 that the first touch input indicates an input to move the shutter button to a second location on the touch-sensitive display 212. In response to the determination, and based on the received last position of the first touch input from the motion module 232, the camera application 248 calculates a set of pixels that comprise the second location. The camera application 248 then moves 1320 the shutter button to the second location.

While the shutter button is displayed at the second location, an image 430 received from the camera is displayed 1325 within the camera view such that the shutter button is displayed over the displayed image. In one embodiment, the representation of the shutter button is changed to be translucent such that the displayed image is visible through the shutter button. While the image is displayed and the shutter button is at the second location, the motion module 232 detects 1330 a second touch input on the shutter button. The second touch input may be a tap or double tap. The motion module 232 receives the associated touch input parameters such as speed, time, location, etc. and forwards it to the camera application 248. The camera application 248 determines 1335 that the touch input indicates an input to activate the shutter button at the second location. In response to the activation of the shutter button, the camera application 248 captures 1340 an image using the camera 191a or 191b.

FIG. 14 is a method flow diagram 1400 for creating and moving a second shutter button to a second location that is different than the location of a first shutter button and capturing an image with the camera using the second shutter button. When executing a camera application 248 on an electronic device 100, a camera view is displayed 1405 including a shutter button at a first location on the touch-sensitive display 212 of the electronic device. The first location is generally located at the center of a bottom panel 455 within a camera view of the camera application 248. While the shutter button is displayed at the first location, the motion module 232 detects 1410 a first touch input on the shutter button on the touch sensitive display 212. The first touch input may be a drag gesture that starts at a first location, continues with a motion and ends at a second location on the touch-sensitive display 212. The motion module 232 receives the last position and parameters such as speed, time, direction, etc. for the touch input and sends it to the camera application 248. The camera application 248 determines 1415 that the first touch input indicates an input to move the shutter button to a second location on the touch-sensitive display 212. In response to the determination, the camera application 248 creates a second shutter button at the first location such that the second shutter button is overlaps the first shutter button. The camera application further calculates a set of pixels that comprise the second location based on the received last position of the first touch input from the motion module 232. The camera application 248 then moves 1420 the shutter button to the second location.

While the second shutter button is displayed at the second location, an image 430 received from the camera is displayed 1425 within the camera view such that the second shutter button is displayed over the displayed image. In one embodiment, the representation of the second shutter button is changed to be translucent such that the displayed image is visible through the second shutter button. While the image is displayed and the second shutter button is at the second location, the motion module 232 detects 1430 a second touch input on the second shutter button. The second touch input may be a tap, double tap or long press gesture. The motion module 232 receives the associated touch input parameters such as speed, time, location, etc. and forwards it to the camera application 248. The camera application 248 determines that the touch input indicates an input to activate the second shutter button. In response to the activation of the second shutter button, the camera application 248 captures 2335 an image using the camera 191a or 191b.

FIG. 15 is a method flow diagram 1500 for displaying a first shutter button at a first location and a second shutter button at a second location and capturing an image with the camera using the second shutter button. When executing a camera application 248 on an electronic device 100, a camera view is displayed 1505 including a shutter button at a first location on the touch-sensitive display 212 of the electronic device. The first location is generally located at the center of a bottom panel 455 within a camera view of the camera application 248. In addition to the first shutter button, a second shutter button is displayed 1510 at a location that overlaps with the first location. In one embodiment, a subset of pixels of the location of the first shutter button overlaps with the set of pixels of the location of the second shutter button, such that some portion of the first shutter button at the first location is visible to a user, indicating that the second shutter button is overlaid on top the first shutter button. The representation of the first shutter button is different than the second shutter button so that each shutter button is visible to a user of the camera application 248. For example, the second shutter 610 button may be of a different color than the first shutter button 420, or a second shutter button 610 may be represented with a fill while the first shutter button 420 may be represented by an outline of the button or other graphically distinguished appearance.

While the first shutter button is displayed at the first location, and the second shutter button is displayed at the first location, the motion module 232 detects 1515 a first touch input on the shutter button on the touch sensitive display 212. The first touch input is a drag gesture that starts at a first location, continues with a motion and ends at a second location on the touch-sensitive display 212. The motion module 232 receives the last position and parameters such as speed, time, direction, etc. for the touch input and sends it to the camera application 248. The camera application 248 determines 1520 that the first touch input indicates an input to move the shutter button to a second location on the touch-sensitive display 212. In response to the determination, and based on the received last position of the first touch input from the motion module 232, the camera application 248 calculates a set of pixels that comprise the second location. The camera application 248 then moves 1520 the shutter button to the second location.

While the first shutter button is displayed at the first location and the second shutter button is displayed at the second location, an image 430 received from the camera is displayed 1525 within the camera view such that the second shutter button is displayed over the displayed image. In one embodiment, the representation of the second shutter button is changed to be translucent such that the displayed image is visible through the second shutter button. While the image is displayed and the second shutter button is at the second location, the motion module 232 detects 1530 a second touch input on the second shutter button. The second touch input is a tap or press gesture. The motion module 232 receives the associated touch input parameters such as speed, time, location, etc. and forwards it to the camera application 248. The camera application 248 determines that the touch input indicates an input to activate the second shutter button. In response to the activation of the second shutter button, the camera application 248 captures 1535 an image using the camera 191a or 191b.

It will also be understood that, although the terms first, second, etc. are, in some instances, used herein to nominally identify various element, these terms are only used to distinguish one element from another. For example, a first button could be termed a second button, and, similarly, a second button could be termed a first button, without departing from the scope of the various described embodiments. The first button and the second button are both buttons, but they are not the same button.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A computer-implemented method in an electronic device having a front and a back, the front having a front facing camera and a touch-sensitive display, the back having a rear facing camera, the cameras controlled by a camera application executed by the electronic device, the touch-sensitive display coupled to the cameras to receive images therefrom, the method comprising:
    displaying a shutter button of a camera application on the touch-sensitive display at a first location;
    while the shutter button is displayed, detecting a first touch event to the shutter button on the touch-sensitive display;
    determining that the first touch event indicates an input to move the shutter button to a user selected second location on the touch-sensitive display;
    responsive to determining that the first touch event indicates an input to move the shutter button to a user selected second location on the touch-sensitive display, automatically switching the touch-sensitive display from displaying an image received by the rear facing camera to displaying an image received by the front facing camera;
    moving the shutter button of the camera application to the second location;
    while the shutter button is displayed at the second location, displaying an image received from the front facing camera, and displaying the shutter button over the displayed image;
    while the shutter button is displayed at the second location, detecting a second touch event to the shutter button; and
    responsive to determining that the second touch event to the shutter button indicates an input to activate the shutter button, capturing at least one image with the front facing camera.

2. The computer-implemented method of claim 1, wherein detecting a first touch event that corresponds to an input to move the shutter button, further comprises:
    detecting a slide gesture that starts from a first location on a screen display and continues with a motion that ends at the second location on the screen display.

3. The computer-implemented method of claim 1, wherein the second touch event that indicates an input to activate the shutter button to capture at least one image comprises a tap input.

4. The computer-implemented method of claim 1, further comprising:
    responsive to determining that the second touch event to the shutter button is an input to activate the shutter button to start capturing a video stream, capturing a video stream with the front facing camera.

5. The computer-implemented method of claim 1, wherein a first location includes a first set of pixels within a boundary represented by a rectangular frame starting at an origin point.

6. The computer-implemented method of claim 1, wherein detecting a second touch event further comprises detecting a tap gesture on the shutter button.

7. The computer-implemented method of claim 1, further comprising:
    determining whether or not to retain the shutter button at the second location;
    responsive to determining to retain the shutter button at the second location, storing the second location for the shutter button, wherein the shutter button is automatically displayed at the second location during a subsequent operation of the camera application; and
    responsive to determining to not retain the shutter button at the second location, relocating the shutter button to the first location after capturing at least one image.

8. The computer implemented method of claim 1, further comprising:
after capturing at least one image using the front facing camera, programmatically determining whether to retain the shutter button at the second location, wherein the shutter button is automatically displayed at the second location during a subsequent operation of the camera application, or to relocate the shutter button to the first location wherein the shutter button is automatically displayed at the first location during a subsequent operation of the camera application.

9. A computer-implemented method in an electronic device having a front and a back, a camera and a touch-sensitive display, the camera controlled by a camera application executed by the electronic device, the touch-sensitive display coupled to the camera to receive images therefrom, the method comprising:
displaying a first shutter button of a camera application at a first location on the touch-sensitive display;
while the first shutter button is displayed, detecting a first touch event to the first shutter button on the touch-sensitive display;
determining that the first touch event indicates an input to move the first shutter button to a user selected second location on the touch-screen display;
creating a second shutter button and moving the second shutter button of the camera application to the second location;
while the second shutter button is displayed at the second location and the first shutter button is displayed at the first location, displaying an image received from the camera, such that the second shutter button is displayed over the displayed image;
while the second shutter button is displayed at the second location and the first shutter button is displayed at the first location, detecting a second touch event to the second shutter button; and
responsive to determining that the second touch event indicates an input to activate the second shutter button, capturing at least one image with the camera.

10. The computer-implemented method of claim 9, wherein detecting a first touch event to the first shutter button, further comprises:
detecting a slide gesture, wherein the slide gesture starts at a first location on a screen display and continues with a motion that ends at the second location on the screen display.

11. The computer-implemented method of claim 9, wherein the camera is a front facing camera, the electronic device further comprising a rear facing camera, the method further comprising:
responsive to determining that the first touch event indicates an input to move the shutter button to a user selected second location on the touch-sensitive display, automatically switching the touch-sensitive display from displaying an image received by the rear facing camera to displaying an image received by the front facing camera.

12. The computer-implemented method of claim 9, further comprising:
responsive to determining that the second touch event to the second shutter button is an input to activate the shutter button to start capturing a video stream, capturing a video stream with the camera.

13. A computer-implemented method in an electronic device having a front and a back, a camera and a touch-sensitive display, the camera controlled by a camera application executed by the electronic device, the touch-sensitive display coupled to the camera to receive images therefrom, the method comprising:
displaying a first shutter button of a camera application at a first location on the touch-sensitive display;
displaying a second shutter button of a camera application on the touch-sensitive display;
while the second shutter button is displayed, detecting a first touch event to the second shutter button on the touch-sensitive display;
determining that the first touch event indicates an input to move the second shutter button to a second location on the touch-screen display, and moving the second shutter button of the camera application to the second location;
while the second shutter button is displayed at the second location and the first shutter button is displayed at the first location, displaying an image received from the camera, such that the second shutter button is displayed over the displayed image;
while the second shutter button is displayed at the second location and the first shutter button is displayed at the first location, detecting a second touch event to the second shutter button; and
responsive to determining that the second touch event indicates an input to activate the second shutter button, capturing at least one image with the camera.

14. The computer-implemented method of claim 13, wherein detecting a first touch event that corresponds to an input to move the shutter button, further comprises:
detecting a slide gesture by detecting a finger down event that starts from the first location on a screen display and continues with a motion that ends at the second location on the screen display.

15. The computer-implemented method of claim 13, wherein detecting a second touch event further comprises detecting a tap gesture on the shutter button.

16. The computer-implemented method of claim 13, wherein a representation of the first shutter button is different from the representation of the second shutter button.

17. The computer-implemented method of claim 13, wherein displaying a second shutter button at the first location further comprises overlapping a set of pixels of the second shutter button with a subset of pixels of the first shutter button.

18. The computer-implemented method of claim 13, further comprising:
determining whether or not to retain the second shutter button at the second location;
responsive to determining to retain the second shutter button at the second location, storing the second location for the second shutter button, wherein the second shutter button is automatically displayed at the second location during a subsequent operation of the camera application; and
responsive to determining to not retain the second shutter button at the second location, relocating the shutter button after capturing at least one image.

19. The computer-implemented method of claim 13, wherein the camera is a front facing camera, the electronic device further comprising a rear facing camera, the method further comprising:
responsive to determining that the first touch event indicates an input to move the second shutter button to a user selected second location on the touch-sensitive display, automatically switching the touch-sensitive display from displaying an image received by the rear facing camera to displaying an image received by the front facing camera; and
responsive to determining the second touch event indicates an input to activate the second shutter button, capturing at least one image with the front facing camera.

20. The computer-implemented method of claim 13, further comprising:
responsive to determining that the second touch event to the second shutter button is an input to activate the shutter button to start capturing a video stream, capturing a video stream with the camera.

21. The computer-implemented method of claim 13, further comprising:
receiving a first co-ordinate value of a pixel at the first location and a first co-ordinate value of a pixel at the second location;
receiving a second co-ordinate value of a pixel at the first location and a second co-ordinate value of a pixel at the second location;
determining a first distance of the second location from the first location by comparing the first co-ordinate value of a pixel at the first location to the first co-ordinate value of a pixel at the second location;
determining a second distance of the second location from the first location comparing the second co-ordinate value of a pixel at the first location to the second co-ordinate value of a pixel at the second location;
comparing the determined first distance and the second distance to a predetermined pixel distance; and
relocating the second shutter button to the first location, in response to determining that the determined first distance and second distance are within the predetermined pixel distance.

22. The computer-implemented method of claim 13, further comprising:
receiving a first co-ordinate value of a pixel at the second location;
receiving a width of the display screen;
determining that the first co-ordinate value of the pixel at the second location is out of bounds of the screen width of the display screen by comparing the first co-ordinate value of a pixel at the second location to the screen width; and
in response to the determination, relocating the second shutter button to the first location.

23. The computer-implemented method of claim 13, further comprising:
receiving a second co-ordinate value of a pixel at the second location;
receiving a height of the display screen;
determining that the second co-ordinate value of the pixel at the second location is out of bounds of the screen height of the display screen by comparing the second co-ordinate value of the pixel at the second location to the screen height; and
in response to the determination, relocating the second shutter button to the first location.

24. A computer-implemented method in an electronic device having a front and a back, a camera and a touch-sensitive display, the camera controlled by a camera application executed by the electronic device, the touch-sensitive display coupled to the camera to receive video frames therefrom, the method comprising:
displaying a shutter button of a camera application on the touch-sensitive display at a first location;
while the shutter button is displayed, detecting a first touch event to the shutter button on the touch-sensitive display;
determining that the first touch event indicates an input to move the shutter button to a user selected second location on the touch-sensitive display;
moving the shutter button of the camera application to the second location;
while the shutter button is displayed at the second location, displaying an image received from the camera, and displaying the shutter button over the displayed image;
while the shutter button is displayed at the second location, detecting a second touch event to the shutter button;
determining whether the second touch event to the shutter button indicates an input to activate the shutter button to capture a single image or indicates an input to activate the shutter button to start capturing a video stream;
responsive to determining that the second touch event to the shutter button is an input to activate the shutter button to capture a single image, capturing a single image with the camera;
responsive to determining that the second touch event to the shutter button is an input to activate the shutter button to start capturing a video stream, capturing a video stream with the camera;
after capturing either the at least one image or the video stream, determining whether or not to retain the shutter button at the second location;
responsive to determining to retain the shutter button at the second location, storing the second location for the shutter button, wherein the shutter button is automatically displayed at the second location during a subsequent operation of the camera application; and
responsive to determining to not retain the shutter button at the second location, relocating the shutter button.

25. The method of claim 24, wherein the input to activate the shutter button to capture a single image comprises a tap input and the input to activate the shutter button to start capturing a video stream comprises a long press input.

26. A computer-implemented method in an electronic device having a front and a back, a camera and a touch-sensitive display, the camera controlled by a camera application executed by the electronic device, the touch-sensitive display coupled to the camera to receive video frames therefrom, the method comprising:
displaying a first shutter button of a camera application at a first location on the touch-sensitive display at a first location;
while the first shutter button is displayed, detecting a first touch event to the first shutter button on the touch-sensitive display;
determining that the first touch event indicates an input to move the first shutter button to a user selected second location on the touch-screen display;
creating a second shutter button at the first location and moving the first shutter button to the second location;
while the first shutter button is displayed at the second location and the second shutter button is displayed at the first location, displaying an image received from the camera, such that the first shutter button is displayed over the displayed image;

while the first shutter button is displayed at the second location and the second shutter button is displayed at the first location, detecting a second touch event to the first shutter button; and responsive to determining that the second touch event indicates an input to activate the second shutter button, capturing at least one image with the camera.

27. An electronic device, comprising:
a front facing camera and a rear facing camera;
a touch-sensitive display configured to display images received by at least one of the cameras;
a memory coupled to the touch-sensitive display; and
one or more processors coupled to the touch-sensitive display and the memory,
one or more modules stored in the memory and configured for execution by the one or more processors to perform the operations comprising:
displaying a shutter button of a camera application on the touch-sensitive display at a first location;
while the shutter button is displayed, detecting a first touch event to the shutter button on the touch-sensitive display;
determining that the first touch event indicates an input to move the shutter button to a user selected second location on the touch-sensitive display;
responsive to determining that the first touch event indicates an input to move the shutter button to a user selected second location on the touch-sensitive display, automatically switching the touch-sensitive display from displaying an image received by the rear facing camera to displaying an image received by front facing camera;
moving the shutter button of the camera application to the second location;
while the shutter button is displayed at the second location, displaying an image received from the front facing camera, and displaying the shutter button over the displayed image;
while the shutter button is displayed at the second location, detecting a second touch event to the shutter button; and
responsive to determining that the second touch event to the shutter button indicates an input to activate the shutter button, capturing at least one image with the front facing camera.

28. The electronic device of claim 27, wherein the one or more modules are further configured for execution by the one or more processors to detect a first touch event that corresponds to an input move the shutter button by:
detecting a slide gesture that starts from a first location on a screen display and continues with a motion that ends at the second location on the screen display.

29. The electronic device of claim 27, wherein the one or more modules are further configured for execution by the one or more processors to perform the operation of:
responsive to determining that the second touch event to the shutter button is an input to activate the shutter button to start capturing a video stream, capturing a video stream with the front facing camera.

30. The electronic device of claim 27, wherein the one or more modules are further configured for execution by the one or more processors to perform the operation of:
determining whether or not to retain the shutter button at the second location;
responsive to determining to retain the shutter button at the second location, storing the second location for the shutter button, wherein the shutter button is automatically displayed at the second location during a subsequent operation of the camera application; and
responsive to determining to not retain the shutter button at the second location, relocating the shutter button to the first location after capturing at least one image.

31. The computer implemented method of claim 27, wherein the one or more modules are further configured for execution by the one or more processors to perform the operation of:
after capturing at least one image using the front facing camera, determining whether to retain the shutter button at the second location, to allow the shutter button to be automatically displayed at the second location during a subsequent operation of the camera application, or to relocate the shutter button to the first location to allow the shutter button to be automatically displayed at the first location during a subsequent operation of the camera application.

32. An electronic device, comprising:
a front facing camera and a rear facing camera;
a touch-sensitive display configured to display images received by the cameras;
a memory coupled to the touch-sensitive display; and
one or more processors coupled to the touch-sensitive display and the memory,
one or more modules stored in the memory and configured for execution by the one or more processors to perform the operations comprising:
displaying a first shutter button of a camera application at a first location on the touch-sensitive display;
while the first shutter button is displayed, detecting a first touch event to the first shutter button on the touch-sensitive display;
determining that the first touch event indicates an input to move the first shutter button to a user selected second location on the touch-screen display;
creating a second shutter button and moving the second shutter button of the camera application to the second location;
while the second shutter button is displayed at the second location and the first shutter button is displayed at the first location, displaying an image received from the camera, such that the second shutter button is displayed over the displayed image;
while the second shutter button is displayed at the second location and the first shutter button is displayed at the first location, detecting a second touch event to the second shutter button; and
responsive to determining that the second touch event indicates an input to activate the second shutter button, capturing at least one image with the camera.

33. The electronic device of claim 32, wherein the one or more modules are further configured for execution by the one or more processors to perform the operation of:
responsive to determining that the first touch event indicates an input to move the shutter button to a user selected second location on the touch-sensitive display, automatically switching the touch-sensitive display from displaying an image received by the rear facing camera to displaying an image received from the front facing camera; and
responsive to determining the second touch event, capturing at least one image with the front facing camera.

34. The electronic device of claim 32, wherein the one or more modules are further configured for execution by the one or more processors to perform the operation of:

responsive determining that the second touch event to the second shutter button is an input to activate the shutter button to start capturing a video stream, capturing a video stream with least one of the front facing camera and the rear facing camera.

35. An electronic device, comprising:
a front facing camera and a rear facing camera;
a touch-sensitive display configured to display images received by the cameras;
a memory coupled to the touch-sensitive display; and
one or more processors coupled to the touch-sensitive display and the memory,
one or more modules stored in the memory and configured for execution by the one or more processors to perform the operations comprising:
  displaying a first shutter button of a camera application at a first location on the touch-sensitive display;
  displaying a second shutter button of a camera application on the touch- sensitive display;
  while the second shutter button is displayed, detecting a first touch event to the second shutter button on the touch-sensitive display;
  determining that the first touch event indicates an input to move the second shutter button to a second location on the touch-screen display, and moving the second shutter button of the camera application to the second location;
  while the second shutter button is displayed at the second location and the first shutter button is displayed at the first location, displaying an image received from the camera, such that the second shutter button is displayed over the displayed image;
  while the second shutter button is displayed at the second location and the first shutter button is displayed at the first location, detecting a second touch event to the second shutter button; and
  responsive to determining that the second touch event indicates an input to activate the second shutter button, capturing at least one image with at least one of the cameras.

36. The electronic device of claim 35, wherein the one or more modules are further configured for execution by the one or more processors to perform the operation of:
  determining whether or not to retain the second shutter button at the second location;
  responsive to determining to retain the second shutter button at the second location, storing the second location for the second shutter button, wherein the second shutter button is automatically displayed at the second location during a subsequent operation of the camera application; and
  responsive to determining to not retain the second shutter button at the second location, relocating the shutter button to an initial location after capturing at least one image.

37. The electronic device of claim 35, wherein the one or more modules are further configured for execution by the one or more processors to perform the operation of
  responsive to determining that the first touch event indicates an input to move the second shutter button to a user selected second location on the touch-sensitive display, automatically switching the touch-sensitive display from displaying an image received by the rear facing display to displaying an image received by the front facing camera; and
  responsive to determining the second touch event indicates an input to activate the second shutter button, capturing at least one image with the front facing camera.

38. The electronic device of claim 35, wherein the one or more modules are further configured for execution by the one or more processors to perform the operation of:
  responsive to determining that the second touch event to the second shutter button is an input to activate the shutter button to start capturing a video stream, capturing a video stream with the camera.

39. An electronic device, comprising:
a front facing camera and a rear facing camera;
a touch-sensitive display configured to display images received by the cameras;
a memory coupled to the touch-sensitive display, and configured to store a camera application; and
one or more processors coupled to the touch-sensitive display and the memory,
one or more modules stored in the memory and configured for execution by the one or more processors to perform the operations comprising:
  displaying a shutter button of a camera application on the touch-sensitive display at a first location;
  while the shutter button is displayed, detecting a first touch event to the shutter button on the touch-sensitive display;
  determining that the first touch event indicates an input to move the shutter button to a user selected second location on the touch-sensitive display, and in response thereto moving the shutter button of the camera application to the second location;
  while the shutter button is displayed at the second location, displaying an image received from the camera, and displaying the shutter button over the displayed image;
  while the shutter button is displayed at the second location, detecting a second touch event to the shutter button;
  determining whether the second touch event to the shutter button indicates an input to activate the shutter button to capture at least one image or indicates an input to activate the shutter button to start capturing a video stream;
  responsive to determining that the second touch event to the shutter button is an input to activate the shutter button to capture at least one image, capturing at least one image with at least one of the cameras;
  responsive to determining that the second touch event to the shutter button is an input to activate the shutter button to start capturing a video stream, capturing a video stream with the at least one of the cameras;
  after capturing either the at least one image or the video stream, determining whether or not to retain the shutter button at the second location;
  responsive to determining to retain the shutter button at the second location, storing the second location for shutter button, wherein the shutter button is automatically displayed at the second location during a subsequent operation of the camera application; and
  responsive to determining to not retain the shutter button at the second location, relocating the shutter button to the first location.

40. An electronic device, comprising:
a front facing camera and a rear facing camera;
a touch-sensitive display configured to display images received by the cameras;

a memory coupled to the touch-sensitive display, and configured to store a camera application; and
one or more processors coupled to the touch-sensitive display and the memory,
one or more modules stored in the memory and configured for execution by the one or more processors to perform the operations comprising:
displaying a first shutter button of a camera application at a first location on the touch-sensitive display at a first location;
while the first shutter button is displayed, detecting a first touch event to the first shutter button on the touch-sensitive display;
determining that the first touch event indicates an input to move the first shutter button to a user selected second location on the touch-screen display;
creating a second shutter button at the first location and moving the first shutter button to the second location;
while the first shutter button is displayed at the second location and the second shutter button is displayed at the first location, displaying an image received from the camera, such that the first shutter button is displayed over the displayed image;
while the first shutter button is displayed at the second location and the second shutter button is displayed at the first location, detecting a second touch event to the first shutter button; and
responsive to determining that the second touch event indicates an input to activate the second shutter button, capturing at least one image with at least one of the cameras.

41. An electronic device, comprising:
a front facing camera and a rear facing camera;
a touch-sensitive display configured to display images received by at least one of the cameras;
a graphical user interface displayed on the touch-sensitive display, the graphical user interface comprising:
a shutter button displayed at a first location on the touch-sensitive display, the shutter button responsive to a first touch event to move the shutter button to a user-selected second location on the touch-sensitive display, and to automatically switch the touch-sensitive display from displaying an image received by the rear facing camera to displaying an image received from the front facing camera; and
with the shutter button at the user selected second location, the shutter button responsive to a second touch event to activate the front facing camera to capture at least one image.

42. An electronic device, comprising:
a front facing camera and a rear facing camera;
a touch-sensitive display configured to display images received by at least one of the cameras;
a graphical user interface displayed on the touch-sensitive display, the graphical user interface comprising:
a first shutter button displayed at first location on the touch-sensitive display;
a second shutter button displayed on the touch-sensitive display, the second shutter button responsive to a first touch event to move the second shutter button to the second location on the touch-sensitive display; and
wherein the second shutter button is further responsive to a second touch event to activate at least one of the cameras to capture at least one image.

43. The electronic device of claim 42, wherein in response to the first touch event to move the second shutter button, the touch-sensitive display is configured to automatically switch from displaying an image received by the rear facing camera to displaying an image received from the front facing camera, and wherein the electronic device, in response to the second touch event, is configured to capture at least one image with the front facing camera.

44. An electronic device, comprising:
a front facing camera and a rear facing camera;
a touch-sensitive display configured to display images received by at least one of the cameras;
a graphical user interface displayed on the touch-sensitive display, the graphical user interface comprising:
a first shutter button displayed at first location on the touch-sensitive display, the first shutter button responsive to a first touch event to move the first shutter button to a user-selected second location on the touch-sensitive display, to automatically create a movable second shutter button on the touch-sensitive display and to move the second shutter to the second location;
the movable second shutter button responsive to a second touch event to activate at least one of the cameras to capture at least one image.

45. The electronic device of claim 44, wherein the electronic device, in response to the first touch event to move the first shutter button, is configured to automatically switch the touch-sensitive display from displaying an image received by the rear facing camera to displaying an image received from the front facing camera, and wherein the electronic device, in response to the second touch event, is configured to capture at least one image with the front facing camera.

46. An electronic device, comprising:
a front facing camera and a rear facing camera;
a touch-sensitive display configured to display images received by at least one of the cameras;
a graphical user interface displayed on the touch-sensitive display, the graphical user interface comprising:
a first shutter button displayed at first location on the touch-sensitive display, the first shutter button responsive to a first touch event to automatically create a second shutter button at the first location on the touch-sensitive display and to move the first shutter button to the second location on the touch-sensitive display; and
the first shutter button responsive to a second touch event to activate at least one of the cameras to capture at least one image.

47. A computer readable storage medium storing computer program modules which when executed by a processor cause a portable electronic device having a touch-sensitive display, a front facing camera, and a rear facing camera, to perform a method comprising:
displaying a shutter button of a camera application on the touch-sensitive display at a first location;
while the shutter button is displayed, detecting a first touch event to the shutter button on the touch-sensitive display;
determining that the first touch event indicates an input to move the shutter button to a user selected second location on the touch-sensitive display;
responsive to determining that the first touch event indicates an input to move the shutter button to a user selected second location on the touch-sensitive display, automatically switching the touch-sensitive display from displaying an image received by the rear facing camera to displaying an image received from the front facing camera;

moving the shutter button of the camera application to the second location;

while the shutter button is displayed at the second location, displaying an image received from the front facing camera, and displaying the shutter button over the displayed image;

while the shutter button is displayed at the second location, detecting a second touch event to the shutter button; and responsive to determining that the second touch event to the shutter button indicates an input to activate the shutter button, capturing at least one image with the front facing camera.

48. A computer readable storage medium storing computer program modules which when executed by a processor cause a portable electronic device having a touch-sensitive display and the camera, to perform a method comprising:

displaying a first shutter button of a camera application at a first location on the touch-sensitive display at a first location;

while the first shutter button is displayed, detecting a first touch event to the first shutter button on the touch-sensitive display;

determining that the first touch event indicates an input to move the first shutter button to a user selected second location on the touch-screen display;

creating a second shutter button and moving the second shutter button of the camera application to the second location;

while the second shutter button is displayed at the second location and the first shutter button is displayed at the first location, displaying an image received from the camera, such that the second shutter button is displayed over the displayed image;

while the second shutter button is displayed at the second location and the first shutter button is displayed at the first location, detecting a second touch event to the second shutter button; and responsive to determining that the second touch event indicates an input to activate the second shutter button, capturing at least one image with the camera.

49. A computer readable storage medium storing computer program modules which when executed by a processor cause a portable electronic device having a touch-sensitive display and a camera, to perform a method comprising:

displaying a first shutter button of a camera application at a first location on the touch-sensitive display;

displaying a second shutter button of a camera application on the touch-sensitive display;

while the second shutter button is displayed, detecting a first touch event to the second shutter button on the touch-sensitive display;

determining that the first touch event indicates an input to move the second shutter button to a second location on the touch-screen display, and moving the second shutter button of the camera application to the second location;

while the second shutter button is displayed at the second location and the first shutter button is displayed at the first location, displaying an image received from the camera, such that the second shutter button is displayed over the displayed image;

while the second shutter button is displayed at the second location and the first shutter button is displayed at the first location, detecting a second touch event to the second shutter button; and responsive to determining that the second touch event indicates an input to activate the second shutter button, capturing at least one image with the camera.

50. A computer readable storage medium storing computer program modules which when executed by a processor cause a portable electronic device having a touch-sensitive display and the camera, to perform a method comprising:

displaying a first shutter button of a camera application at a first location on the touch-sensitive display at a first location;

while the first shutter button is displayed, detecting a first touch event to the first shutter button on the touch-sensitive display;

determining that the first touch event indicates an input to move the first shutter button to a user selected second location on the touch-screen display;

creating a second shutter button at the first location and moving the first shutter button to the second location;

while the first shutter button is displayed at the second location and the second shutter button is displayed at the first location, displaying an image received from the camera, such that the first shutter button is displayed over the displayed image;

while the first shutter button is displayed at the second location and the second shutter button is displayed at the first location, detecting a second touch event to the first shutter button; and responsive to determining that the second touch event indicates an input to activate the second shutter button, capturing at least one image with the camera.

* * * * *